United States Patent
Noh et al.

(10) Patent No.: US 7,969,997 B1
(45) Date of Patent: Jun. 28, 2011

(54) VIDEO COMMUNICATIONS IN A PEER-TO-PEER NETWORK

(75) Inventors: Jeonghun Noh, Stanford, CA (US); Eric E. Setton, Palo Alto, CA (US); Bernd Girod, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 988 days.

(21) Appl. No.: 11/592,776

(22) Filed: Nov. 3, 2006

Related U.S. Application Data

(60) Provisional application No. 60/733,561, filed on Nov. 4, 2005.

(51) Int. Cl.
  *H04L 12/28* (2006.01)
  *H04L 12/56* (2006.01)
  *G06F 15/16* (2006.01)
(52) U.S. Cl. .................. 370/408; 370/256; 709/231
(58) Field of Classification Search .............. 370/392, 370/229, 230, 231, 230.1, 235, 256, 408; 375/240.26, 240.01; 709/231, 250; 725/74, 725/78, 84
See application file for complete search history.

(56) References Cited

U.S. PATENT DOCUMENTS

| | | | | |
|---|---|---|---|---|
| 5,875,176 | A  * | 2/1999 | Sherer et al. | 370/230 |
| 7,283,472 | B2 * | 10/2007 | Widmer et al. | 370/230.1 |
| 7,460,476 | B1 * | 12/2008 | Morris et al. | 370/230.1 |
| 7,577,750 | B2 * | 8/2009 | Shen et al. | 709/231 |
| 2003/0123491 | A1 * | 7/2003 | Couillard | 370/508 |
| 2003/0231607 | A1 * | 12/2003 | Scanlon et al. | 370/338 |
| 2003/0236904 | A1 * | 12/2003 | Walpole et al. | 709/231 |
| 2004/0022322 | A1 * | 2/2004 | Dye | 375/240.26 |
| 2004/0143672 | A1 * | 7/2004 | Padmanabham et al. | 709/231 |
| 2005/0144643 | A1 * | 6/2005 | Hakenberg et al. | 725/86 |
| 2005/0249226 | A1 * | 11/2005 | Kang | 370/412 |
| 2006/0095944 | A1 * | 5/2006 | Demircin et al. | 725/81 |
| 2006/0227724 | A1 * | 10/2006 | Thubert et al. | 370/254 |
| 2007/0002742 | A1 * | 1/2007 | Krishnaswamy et al. | 370/235 |
| 2007/0258440 | A1 * | 11/2007 | Watanabe | 370/352 |
| 2008/0040509 | A1 * | 2/2008 | Werb et al. | 709/242 |
| 2008/0115185 | A1 * | 5/2008 | Qiu et al. | 725/118 |
| 2008/0177833 | A1 * | 7/2008 | Gu et al. | 709/204 |

* cited by examiner

*Primary Examiner* — Ayaz R Sheikh
*Assistant Examiner* — Hoang-Chuong Q Vu
(74) *Attorney, Agent, or Firm* — Crawford Maunu PLLC

(57) ABSTRACT

Packet-based delivery of video content is facilitated using a peer-to-peer network. According to an example embodiment of the present invention, a packet-based video stream is passed over a peer-to-peer network, with the packets in the stream scheduled and delivered in accordance with a priority assigned to the packets; this priority is based upon a determined or estimated effect that the packet will have upon video quality at a recipient peer. In some applications, the packets are temporally spaced to mitigate congestion and/or distortion of video associated with congestion in the delivery of the packets.

26 Claims, 15 Drawing Sheets

VIDEO COMMUNICATIONS IN A PEER-TO-PEER NETWORK

RELATED PATENT DOCUMENTS

This patent document claims the benefit, under 35 U.S.C. §119(e), of U.S. Provisional Patent Application No. 60/733,561 filed on Nov. 4, 2005 and entitled "Rate-distortion optimized video peer-to-peer multicast streaming."

FIELD OF THE INVENTION

The present invention relates generally to communications, and more particularly to packet-based video communications in a peer-to-peer network.

BACKGROUND

Packet-based video streaming has been used in a variety of broadcast and on-demand video applications for a variety of types of video such as sporting events, television, concerts and movies. With these approaches, video data is packetized in accordance with a communications protocol for a particular network over which the video is to be delivered. The packetized video data is delivered to recipients in one or more of a variety of manners, using a host or source to provide the video data. In some applications, network nodes (e.g., servers or peers) both receive video data and provide the received video data to recipients.

One approach to packet-based video transfer involves a peer-to-peer (P2P) transfer approach, where viewers contribute their resources to the network to act as relays for the media streams. Such peer-to-peer transfer has grown tremendously in recent years. In 2003, peer-to-peer became the most popular Web application, and, at the end of 2004, peer-to-peer protocols represented over 60% of the total Internet traffic, dwarfing web browsing, which is the second most popular application. This rapid success is fueled by file transfer networks that allow users to swap media files, despite the large latency often necessary to complete a download. Growth in peer-to-peer approaches is expected to continue at a fast pace, as new compelling peer-to-peer applications are developed.

One approach to peer-to-peer video transfer is peer-to-peer multicast, where a media stream is sent to a large audience using the uplink of viewers in the audience to forward the media stream. Similar to file transfer networks, data propagation is accomplished, via a distributed protocol, which lets peers self-organize into distribution trees or meshes. Different transmission trees are established, which connect the different peers interested in receiving the media stream. These trees are rooted at the source and the branches of each tree link a peer to its descendants. Complementary portions of the video stream are distributed over the different trees, and peers join each of the multiple trees to decode and playout the video successfully. As video traffic is relayed by the peers along the different branches of the multicast trees, the video source need only serve a small subset of peers.

While useful and growing in popularity, peer-to-peer approaches such as those involving multicast have been limited in their ability to provide quality video, particularly on a real-time basis, as is desirable to achieve a TV-like viewing experience. For example, the access bandwidth of peers is often insufficient to support high quality video, peers may choose to disconnect at any time (making for an unreliable and dynamic network fabric), and each relay point or "hop" in a peer-to-peer network (e.g., a peer's PC that relays data) introduces additional delay. When links are congested, these challenges become exacerbated, particularly for low-latency applications such as interactive video streaming.

These and other characteristics have been challenging to the implementation of video in packet-based network environments.

SUMMARY

The present invention is directed to overcoming the above-mentioned challenges and others related to the types of applications discussed above and in other applications. These and other aspects of the present invention are exemplified in a number of illustrated implementations and applications, some of which are shown in the figures and characterized in the claims section that follows.

According to an example embodiment of the present invention, peer-to-peer packet-based video streaming is facilitated using an approach to the prioritization of packets for delivery from one peer to another. For packets in a queue for delivery to one or more peers, the packets are delivered in accordance with a priority associated with each packet that is related to the quality of video to be presented at the peers.

According to another example embodiment of the present invention, and as may be implemented in connection with the above prioritization approach, packets are temporally spaced to mitigate congestion in the delivery of the packets to a peer.

In connection with another example embodiment of the present invention, an efficient encoding rate is determined for a low-latency streaming architecture that facilitates a tradeoff between video quality and self-inflicted congestion. For instance, in some applications, such an approach involves making a determination of an amount of over-provisioning for links supporting a delay-constrained video stream.

According to another example embodiment of the present invention, pre-encoded streams are passed over a peer-to-peer packet-based network in a manner that mitigates distortion of video presented at the peers. Packets of the pre-encoded streams are scheduled for delivery (and subsequently delivered) using estimated congestion-distortion characteristics of the video. With this approach, a determination is made as to which packets should be sent, and at which time, to facilitate a desirable decoded video quality while mitigating or avoiding the creation of unnecessary queuing delay over links in the network.

According to another example embodiment of the present invention, a system communicates packetized video over a peer-to-peer packet-based network using packet-by-packet video transmission scheduling. A video source provides a packet-based video stream to the packet-based network. A plurality of peer packet-based devices are coupled to the packet-based network to receive video packets and send video packets to other peers in the network. The video source and the peer devices facilitate video communications for passing video data from the video source to the plurality of peer devices by processing selected packets in the video stream at a higher priority than other packets and by temporally spacing the packets in the packet stream to mitigate congestion on the peer-to-peer packet-based network. The prioritization is effected, for example, based upon the effect of the packets upon the quality of video at the peer devices, as estimated or otherwise determined.

According to another example embodiment of the present invention, a packet-based peer device relays packetized video over a peer-to-peer packet-based network using packet-by-packet video transmission scheduling. The packet-based network has an ancestral tree structure including at least two peers to which the peer device streams the packetized video, and at least one source from which the peer device receives packetized video. The peer device includes a prioritization engine that prioritizes packets in a queue as a function of the effect of the packet upon a video frame and characteristics of the ancestral tree structure. The peer device also includes a packet processing engine that delivers a packetized stream of video to other peers in response to the prioritization of the packets. In some applications, the peer device is a personal computer (PC) or other packet-communicating device programmed with functionality for the prioritization engine and the packet processing engine.

The above summary is not intended to describe each illustrated embodiment or every implementation of the present invention. The figures and detailed description that follow more particularly exemplify these embodiments

BRIEF DESCRIPTION OF THE FIGURES

The invention may be more completely understood in consideration of the detailed description of various embodiments of the invention that follows in connection with the accompanying drawings in which.

Figure 1A:
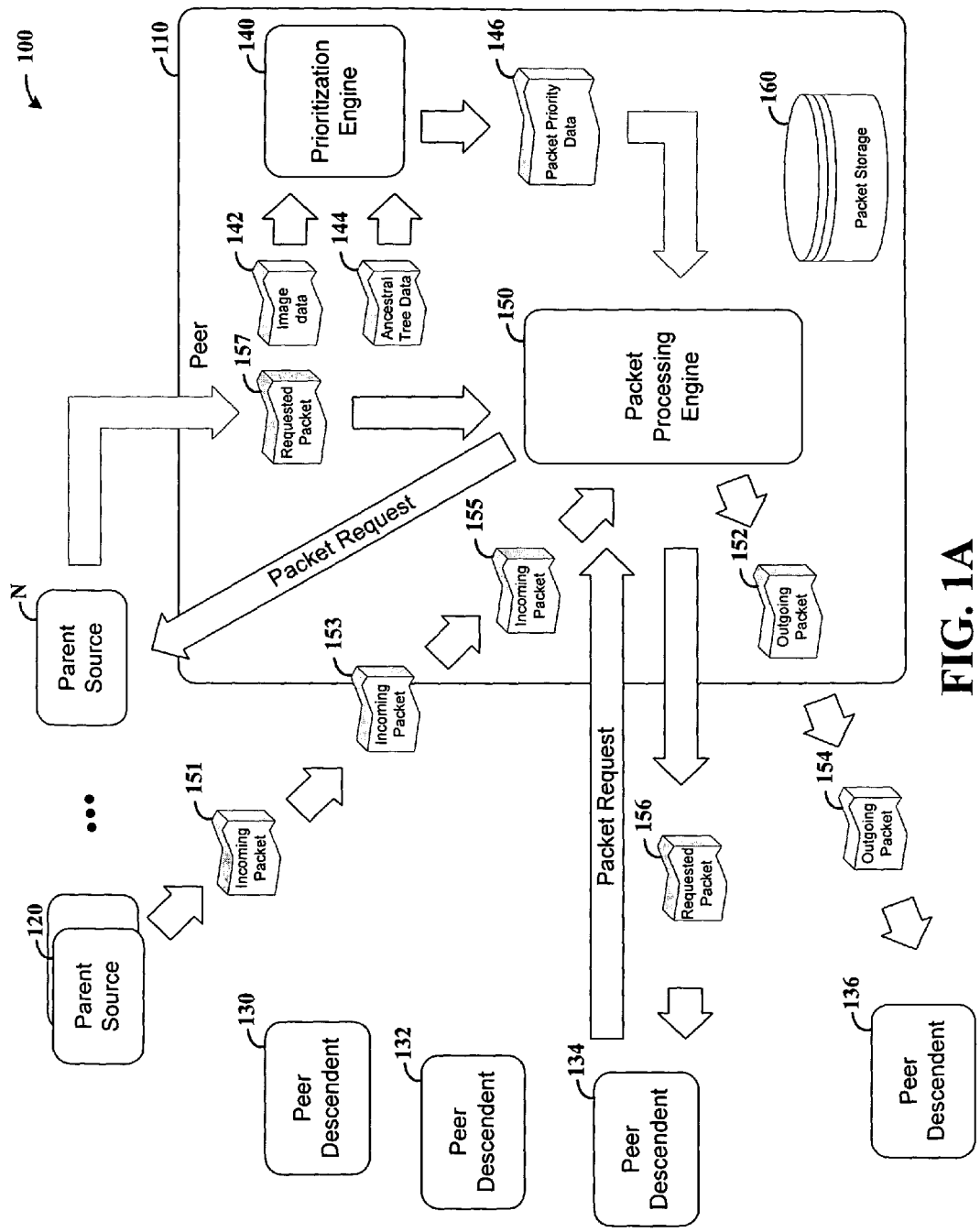
FIG. 1A shows a system and approach to delivery of a packet-based video stream in a peer-to-peer network, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different video applications, devices and networks, and the invention has been found to be particularly suited for the delivery of packet-based video in a peer-to-peer network. While the present invention is not necessarily limited to such applications, various aspects of the invention may be appreciated through a discussion of examples using this context.

According to an example embodiment of the present invention, a peer-to-peer packet-based video streaming system includes peers implementing video delivery approaches that involve selectively-weighted video packet delivery priorities. The network is established among peers, with each peer receiving a video stream from at least one source, such as a primary source with a secondary source identified as a backup. Each peer is also adapted for scheduling and passing received streamed video packets to one or more other peers in the network, using the aforesaid video delivery approaches. A control protocol implemented at the peers facilitates the establishment of a peer tree for each peer, the prioritization of video packets streamed to other peers, as well as requests for video packets.

Video packets are prioritized at the peers for delivery in one or more of a variety of manners. In one embodiment, each packet in a delivery queue is associated with a particular video frame or a portion of a particular video frame, and an importance of that video frame (or portion) is determined, relative to other video frames to which other packets in the delivery queue apply, as corresponding to an image quality of the video. The packet or packets in the queue bearing higher relative importance are communicated before packets with lower relative importance.

In some applications, the peer-to-peer network is established as a series of trees, in which the peers are connected to one another such that a parent peer is a peer that delivers video packets to child peers that receive the video packets. Each peer is an interior node or a leaf (i.e., an end node with no child peers to which video is distributed) in all of the different trees in the peer-to-peer network, unless the node has been disconnected and is trying to reestablish a connection. Peers receive video traffic from one or more of their different parents in each of the trees. When one of their parents leaves the session, peers issue retransmission requests to the parents they are still connected to, in order to mitigate losses, while the control protocol seeks a suitable parent to reconnect to.

In connection with the above examples, for some embodiments, requests for missing packets are prioritized at a requesting peer (e.g., a child peer), and in other applications, are prioritized at a peer serving the request (e.g., a parent peer), in a manner similar to the prioritization of video packets in a queue for delivery. For instance, where a series of packets is requested for re-transmission to a particular peer, or for another peer to which the particular peer is to deliver the series of packets, packets in the series are prioritized for delivery to the requesting peer as described above. Where prioritization is implemented at a requesting peer, the packets are requested according to the prioritization, with the request being served accordingly. Where prioritization is implemented at a serving peer (or other video source), the re-transmission request is sent to the serving peer, which prioritizes packets in the re-transmission request.

According to another example embodiment of the present invention, a packet-based video scheduling approach for peer-to-peer networks involves the use of congestion-distortion scheduling in presenting video packets from a peer to other peers. A prioritization scheme is used to schedule the transmission of video packets destined to multiple peers, with the prioritization based upon the unequal contribution of different packets to overall video distortion, and information about the structure of the peer-to-peer network to favor peers with a large set of descendants. Packet transmissions from each peer are spaced to mitigate and/or avoid creating congestion on an uplink from which the peer receives video packets. Peers receiving the video packets scheduled with the congestion-distortion scheduling implement a distortion-based scheduling approach to recover missing video packets when the peer is disconnected from one (or several) peer-to-peer tree(s) or otherwise benefits from a re-transmission of packets (e.g., for lost or damaged packets).

In another example embodiment of the present invention, a distortion-based scheduling approach, such as those described, above, is implemented in connection with an adaptive scheduling approach involving the selective use of switching slices. For instance, one such application involves adaptive scheduling of video packets using switching intra (SI) slices and switching predicted (SP) slices. An SI slice facilitates complete decoding of an image without knowledge of other slices, and the SP slice is encoded and decoded using data from other slices. Generally, an SP slice approach is used to transmit the same image as an SI slice while using less bandwidth, but can lead to error propagation associated with reliance upon data from other slices. In this regard, SI frames are selectively inserted into a video stream to facilitate performance of the video stream, at a video source as well as at peers redistributing the video, as appropriate. An SI frame is regenerated at a peer to create an SI picture during the decoding process of an SP frame. Such an SI picture may be implemented, for example, to stop decoding errors. For general information regarding SI and SP slices, and for specific information regarding such approaches as may be implemented in connection with one or more example embodiments herein, reference may be made to ITU-T and ISO/IEC JTC1, Advanced Coding for Generic Audiovisual Services, ITU-T Recommendation H.264—ISO/IEC 14496-10(AVC), 2003, which is fully incorporated herein by reference.

Turning now to the figures, FIG. 1A shows an arrangement and approach 100 to video packet scheduling, according to another example embodiment of the present invention. The arrangement 100 includes a plurality of peers in a peer network, with several peers and parents shown by way of example; for various approaches, a multitude of additional peers are implemented as parents and/or descendents in the context of different peer-to-peer tree structures. In addition, the shown peers may be implemented as both parents and descendents, depending upon the context. In this regard, reference may be made to FIG. 1B for an example tree-type structure in which the arrangement and approach 100 may be implemented for various example embodiments.

In FIG. 1A, peer 110 is shown in detail, with parent peers 120-N shown as video sources to the peer 110, and descendent peers 130, 132, 134 and 136 shown as peer descendents. Referring to the tree structure 105 of peers in FIG. 1B by way of example, peer 110 may be implemented with peer 180, having parent source 178 as a primary source and parent source 170 as a secondary source. Such an approach may involve, for example, parent sources 178 and 170 corresponding to parent source peers 120 and N of FIG. 1A, with descendent peers 182, 184, 186 and 188 (e.g., corresponding to descendents 130, 132, 134 and 136. Each of the peers shown in FIG. 1A and FIG. 1B may be implemented in a manner similar to that shown in detail with peer 110, as a parent or descendent peer, as well as with multiple tree structures involving common and/or different peers, with such discussion omitted here for brevity.

Generally, parent sources 120-N provide video packets to the peer 110, which provides the received packet-based video to peers 130-136. In this context, the peer 110 acts as a peer descendent, relative to parent sources 120-N, and as a parent source peer, relative to peer descendents 130-136. Moreover, each of peer descendents 130-136 may correspondingly act as a peer parent source to additional peer descendents. In addition, for certain applications, one or more of the parent sources 120-N are video sources such as broadcast or video distribution sources, that do not playback video in the context of the peers. For instance, referring to FIG. 1B again, peer 170 may be implemented as such a source, providing video distribution to all other peers in the tree 105 by way of immediate descendent peers 172, 174, 176 and 178, and selectively with additional peers as shown by dashed connections.

The peer 110 includes a packet processing engine 150 that processes incoming packets and facilitates the delivery of outgoing packets for video streams. The packet processing engine 150 further facilitates the request of missing packets, or of a stream of packets as appropriate (e.g., when a parent source is disconnected from the network), and serves requests for missing packets as received from peer descendents. The peer 110 also includes a prioritization engine 140 that facilitates the prioritization of packet delivery to peer descendents, as well as the prioritization of packet requests sent to one or more parent sources. In certain embodiments, the peer 110 includes a packet storage arrangement 160 that stores video packets (e.g., a queue of packets to be sent to other descendents or played back at the peer), or an entire set of video data.

For illustration, the following description involves the delivery of a packet-based video stream, represented by incoming packets 151, 153 and 155, from parent source 120 to the peer 110, and the corresponding distribution of a packet stream, represented by outgoing packets 152 and 154, corresponding to the same video stream to peer descendent 136. However, the approaches described are applicable to implementation with each of the parent sources 120-N and peer descendents 130-136. In addition, for many applications, the peer 110 receives several groups, or streams, of packets from different sources for a particular video stream, and combines the packets for playback and/or distribution to other descendents.

Figure 1B:
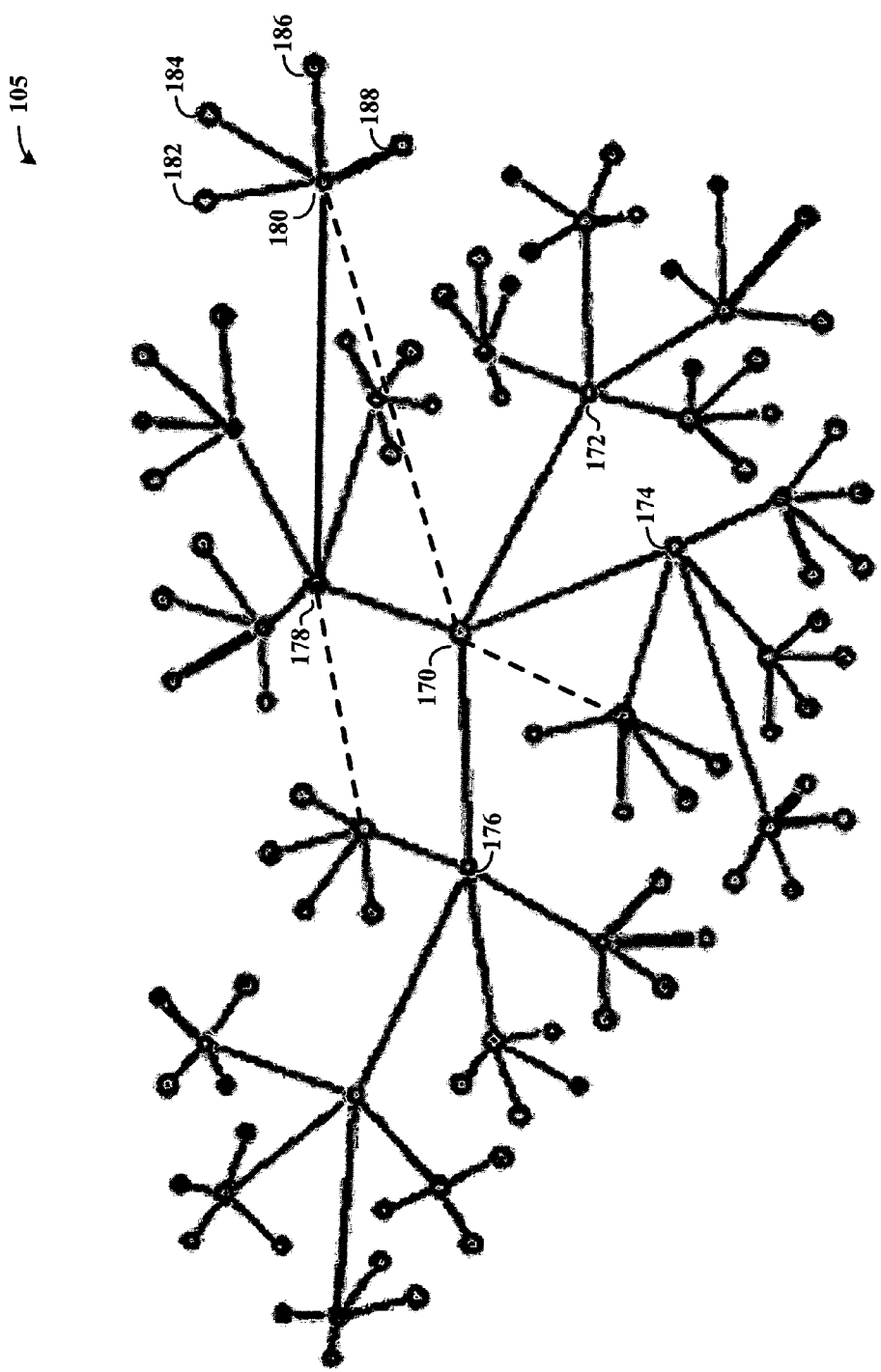
FIG. 1B shows peer-to-peer network arrangements applicable for implementation with the system and approach shown in FIG. 1A, in connection with other example embodiments of the present invention.

Peers in the network, such as that shown in FIG. 1B, establish tree-type relationships involving parent peers that send video data to descendent peers, which in turn may act as parent peers relative to other descendent peers to which the video data is relayed. Various approaches to the establishment of such a tree are described herein, including those with the discussion below. Here, a tree structure is established by the peer 110 as shown, such that the peer identifies each of the parent sources 120-N as video sources, and the peer descendents 130-136 as peers to which delivery can be made. Of note, in certain applications, one or more of the parent sources 120-N may also be a peer descendent, relative to peer 110. Similarly, one or more of the peer descendents 130-136 may also be a parent source, relative to peer 110.

In some embodiments, the peer 110 monitors links to parent sources 120-N to identify any links that become unstable or that terminate due to disconnection of a parent source or other condition. When a parent link becomes unstable or terminates, a tree structure is re-established using one or more different parents, using an approach to the above-discussed establishment of a tree structure for the peer 110. In this regard, the peer 110 insulates itself against unexpected changes in the tree and facilitates rapid recovery from conditions such as those relating to the termination of a video stream.

For delivery of the video stream represented by incoming packets 151-155, the prioritization engine 140 uses image data 142 to prioritize packets in accordance with the effect that the packets have on the quality of the video using, for example, the approaches described above for basing priority upon video frame quality. In some instances, ancestral tree data 144 is also used in the prioritization of video data, such as by assigning higher priority to peer descendents that serve more sub-descendents than other peer descendents, thus affecting the quality of more video in the tree.

The image data 142 includes a variety of information that is used by the prioritization engine 140 in different manners, depending upon the application. For example, in some applications, the image data 142 includes information characterizing video frames for previously-received streaming video received at the peer 110, or for estimated characteristics of video to be received at the peer 110.

The packet processing engine 150 uses the packet priority data 146 in scheduling the delivery of the outgoing packet stream represented by packets 152-154. For instance, where incoming packets are stored in a queue in the packet storage 160, a packet or set of packets corresponding to a highest relative priority at a given instance or frame of time is sent to peer descendents before other packets in the queue at that time.

In some embodiments, the packet processing engine 150 uses characteristics of an uplink to one or more parent sources 120-N in scheduling the delivery of the outgoing packets. In one example, the packet processing engine 150 uses the spacing of incoming packets (e.g., 151-155) to correspondingly set the spacing of outgoing packets (e.g., 152 and 154) to mitigate and/or prevent congestion in communicating an outgoing video stream to the peer descendents.

Relative to requests made by peer descendents to the peer 110 for the delivery and/or re-delivery of video packets, for some embodiments, the prioritization engine 140 prioritizes the delivery of requested packets in a manner similar to that described above with the delivery of an outgoing packet stream. For illustration, peer descendent 134 is shown providing a packet request to the peer 110, which in turn delivers a requested packet 156 (or a stream of such packets, as appropriate). In some applications, requested packets are delivered in accordance with one or more of a determined importance of the packets using image data 142, relative to other packets to be delivered to the requesting descendent, and the importance of the descendent relative to other descendants from an ancestral tree perspective, using ancestral tree data 144.

In other embodiments, the peer descendent making the request assigns a priority to the requested packets (e.g., as described below), and the packet processing engine 150 serves the requests in accordance with the assigned priority and, in some applications, in accordance with a priority associated with ancestral tree data 144 as determined by the prioritization engine 140. For the latter approach and in some applications, the prioritization engine 140 uses packet request data received from a peer descendent, together with ancestral tree data 144, to generate packet priority data 146 corresponding to the packet request and appropriately serve outgoing packets to the peer descendents 130-136.

When packets are missing, damaged or needed for other reasons, the packet processing engine 150 requests packets from one or more of the parent sources 120-N, with a request shown to parent source N, with corresponding delivery of a requested packet 157, for illustration. Consistent with the above discussion made in connection with descendent requests served by the peer 110, the packet request is made using one or more approaches. In some applications, the peer 110 makes a request for a packet or packets from the parent source N, and the parent source N prioritizes the delivery of requested packets to the peer 110, either separately and/or using priority information provided via the peer request. In other applications, the prioritization engine 140 assigns packet priority data 146 to packets to be requested, and the packet processing engine makes the packet request in accordance with the priority data.

In accordance with the above and other description herein, the peer 110 and corresponding packet processing engine 150 and prioritization engine 140 are implemented in one or more of a variety of manners. For instance, the peer 110 may be a personal computer, with hardware and/or software implemented to effect the functions described with one or both of the packet processing engine 150 and the prioritization engine 140. Similarly, the packet storage 160 is implemented with such a personal computer, or with another storage approach such as storage at a network location and/or at an external device, local to the peer 110.

The following embodiments and related discussion involve aspects of the invention that may, for example, be implemented in connection with the arrangement and approach 100 shown in FIG. 1A and/or FIG. 1B. In this regard, reference is made to these figures (FIGS. 1A and 1B) by way of illustration; however, the embodiments are applicable to a variety of peer-to-peer networking approaches. In addition, various references are made to the use of MPEG standards. In this regard, for general information regarding MPEG video transmission, and for specific information regarding approaches implemented in connection with one or more example embodiments, reference may be made to the MPEG standards (including 1, 2, 4, 7, 21 and versions thereof) available from the Moving Picture Experts Group, a working group of the ISO (International Organization for Standardization) of Geneva, Switzerland.

In one embodiment, a multicast source is responsible for sending a media stream over different transmission trees as may be implemented, for example, with one of the parent sources 120-N in FIG. 1A. For illustration, we consider a distribution mechanism where video frames are transmitted, following their encoding order, at regular intervals, 30 times per second (e.g., for a video sequence encoded at 30 frames/s). After MTU (maximum transmission unit) fragmentation, the video frames are sent, packet by packet, over different multicast trees. If the number of trees is denoted by numTrees, Packet n is transmitted over Tree n mod numTrees. This provides a simple mapping between packet numbers and multicast trees. This mapping is helpful for error resilience, as each peer knows the sequence numbers of the different packets it is supposed to receive over each tree. This balanced distribution mechanism also prevents large rate spikes on the trees which could create congestion.

The multicast source is also responsible for packetizing the media stream, prior to transmission. As video is transmitted to the different peers over multiple paths, out-of-order arrivals are expected. Packet headers are therefore used to provide enough information to reconstitute the media stream before decoding. Video packet headers are created by the source; they contain the packet number, the video frame number, the total number of packets in the frame, the place of the particular packet among them and the playout deadline of the packet.

Before transmitting a packet on one of the trees, the source will also indicate in its header the sequence number of the previous packet it transmitted over this tree.

When a peer receives a video packet on one of the multicast trees, it immediately forwards it to its descendants on the same tree, as long as it is not past its playout deadline. For example, relative to FIG. 1A, the packet processing engine 150 may implement such an approach, using data characterizing the playout deadline for packets. Before forwarding packets, the peer 110 updates the header of the video packet to indicate the sequence number of the previous packet it sent on the tree.

Retransmission-of packets is effected-in a variety of manners. In some applications, retransmission is effected when a control protocol detects a parent disconnection, and the peer creates a list of missing packets. This list contains the sequence number of all the packets which should have been received over the tree that the peer is disconnected from. The range considered extends from the next packet to be decoded, to the highest packet number received on the other multicast trees. To ensure that all of the missing packets are identified, the list of missing packets is refreshed (e.g., every 100 ms) until the peer has re-established a connection to the missing tree (or to another tree) and has received several video packets.

In some applications, when packets are dropped, out of order arrivals are detected using information contained in the video header, which includes the sequence number of the packet previously sent along the same multicast tree. A peer requests missing packets that are not past due from its different parents, following the sequence number of the packets, with lower sequence numbers requested first. In various applications, peers requesting retransmissions do so over one or more alternate paths.

In other embodiment, a retransmission scheduler (e.g., implemented with the packet processing engine 150) limits the congestion created by retransmissions by bounding the number of unacknowledged retransmission requests from a peer to each of its parents. In some applications, when two or more parents are available to serve a retransmission request, the peer chooses one of them at random, or chooses one of them based upon characteristics of each parent, such as the ability of the parent to take on more video data traffic and/or the number of descendents that the parent is serving.

Parent sources respond to retransmission requests in a variety of manners. In some applications, when a parent receives a retransmission request for a packet it has not received, the parent informs the requesting peer by sending a negative acknowledgment (NACK) back; if the parent has received the requested packet, it is retransmitted accordingly. The time at which a retransmission reply will be received by the peer depends on the state of the bottleneck queue of its parent, on its uplink throughput and on future packet arrivals. Peers are programmed to characterize a retransmission request as lost if it has not been acknowledged or if no reply has been received in some specified time, and accordingly resubmits a retransmission request, to the same or a different parent.

In another example embodiment, a congestion-distortion optimized (CoDiO) approach is implemented for scheduling the transmission (or retransmission) of video packets from peer-to-peer. Video is scheduled in a server-client scenario using CoDiO or CoDiO light approaches using a video streaming protocol without acknowledgments (ACKs), thereby mitigating any reduction in uplink throughput of clients in peer-to-peer streaming as would be associated with ACKs. Generally, CoDiO approaches have implemented ACKs; with this embodiment, a CoDiO approach is implemented without ACKs, using a sender-driven prioritization scheme together with knowledge of the peer-to-peer tree structure over which the video is distributed. The transmission of video packets destined to multiple peers is scheduled, based upon the unequal contribution of different packets to overall video distortion, and information collected about the structure of the tree or trees to favor peers with a large set of descendents. In addition, the transmissions are spaced to mitigate or avoid the creation of congestion on an uplink to the transmitting peer. At the receiver peer, a distortion-based algorithm is implemented to recover missing video packets when the receiver peer is disconnected from one (or several) multicast tree(s).

In connection with other example embodiments of the present invention, a video packet sender-driven prioritization approach is implemented as follows to mitigate congestion on multi-hop paths separating the sender from any particular recipient peer. For example, where the rate of a video stream varies or where unexpected retransmission requests are made, a peer may sometimes lack the resources to forward all the data expected by its descendents. In such instances, the peer implements a scheduling approach to maintain video quality; for certain applications, the peer delays or drops some packets to ensure timely delivery of a more significant portion of the video. A prioritization approach (e.g., an algorithm implemented with the prioritization engine 140) iteratively determines the next most important packet by comparing the importance of each queued packet. As packets in the queue change (are sent, dropped or added to the queue), these changes are used in prioritizing packets in the queue.

For Packet n the importance, denoted by the quantity $\tilde{D}(n)$, is computed at a peer (or video source) as a function of the video frame type and of the order in the GOP (group of packets). This quantity reflects the sensitivity of the video quality to the reception of the packet. In some applications, this sensitivity is estimated such as when peers do not collect detailed rate-distortion information about the stream they are transmitting and when the state of the reception buffer of their descendents is not known, this sensitivity needs to be approximated. For certain applications, the quantity $\tilde{D}(n)$ is set as the number of frames that will be affected if the frame Packet n belongs to is not decoded correctly.

One example encoding structure showing an importance $\tilde{D}(n)$ of different frames for an open encoding structure with periodic I frames (intraframes) is as follows:

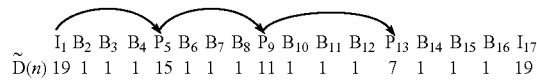

$I_1 \ B_2 \ B_3 \ B_4 \ P_5 \ B_6 \ B_7 \ B_8 \ P_9 \ B_{10} \ B_{11} \ B_{12} \ P_{13} \ B_{14} \ B_{15} \ B_{16} \ I_{17}$
$\tilde{D}(n) \ 19 \ 1 \ 1 \ 1 \ 15 \ 1 \ 1 \ 1 \ 11 \ 1 \ 1 \ 1 \ 7 \ 1 \ 1 \ 1 \ 19$ With the importance of an I frame at 19, its loss affects the 16-frame GOP as well as the 3 preceding B frames (a bi-directional or bi-directional predictive frame for MPEG). The importance of the different P frames (predictive, or predicted frame for MPEG) is 15, 11 and 7, depending on their place in the GOP, and the importance of each B frame is 1. In a peer-to-peer multicast scenario using CoDiO P2P (peer-to-peer), a peer schedules video streams packet by packet, rather than frame by frame; in this case, the importance of a packet corresponds to the importance of the frame it belongs to. In this regard, the aforesaid determination of frame importance is applied to packets belonging to that frame in prioritizing the packets, relative to packets that belong to other frames. The peer scheduling packets considers packets or frames as long as they are not past their playout deadline, and further adjusts the priority of packets to the number of descendents in the multicast tree that would be affected by the loss or late arrival of this packet.

In some applications, each next most important packet in a particular queue is determined by comparing the impact of each queued packet. For a Packet n, addressed to Peer m, the impact is expressed in Equation 5.1, which is applicable to the transmission and retransmission of packets:

$$I(n,m) = \tilde{D}(n) * (\text{NumDescendants}(m)+1) \quad (5.1)$$

In Equation 5.1, NumDescendants(m) represents the number of peers to which Packet n will be forwarded after reaching Peer m, this information is collected by the control protocol when "hello" packets are exchanged between neighboring peers to maintain the multicast trees. The quantity $\tilde{D}(n)$ is the importance described above.

Successive transmissions are spaced to ensure congestion is not created on the bottleneck link of the network path (i.e., the uplink of the forwarding peer), which is assumed as not shared with other applications. In this regard, transmissions are spaced based on the time needed for the previous video packet to traverse the uplink. In some applications, a small portion of the link is reserved to account for control traffic to limit the delay of control packets. In some implementations, 20 kb/s of throughput is set aside for this purpose, regardless of the uplink bandwidth for the peer.

In connection with various embodiments, a distortion-optimized approach is implemented, with optimization in this context relating to one or more degrees of mitigation of distortion, as follows. A list of missing frames is first determined by forming an estimated mapping between missing packets and their corresponding frame using the information contained in the header of the received video packets, such as information corresponding to one or more of packet number, frame number and number of packets in the frame. In some applications, the following algorithm A is used to estimate the frame number of a missing packet, n. The value initialized, associated with a frame, indicates whether a packet for this frame has been received. If the packet has been received, then the sequence number of the packets composing the frame is known, and in particular, the first_packet and the last_packet of the frame. The current_frame is the frame displayed by the peer. In some applications, history_window is set equal to 64. Upper and lower bounds for the frame number corresponding to Packet n are set; if during the process the frame number is not determined, the average between the upper and lower bound is returned.

Algorithm A: MapPacketToFrame(n)
comment: First, find an upper bound for the frame number.

```
upper_bound ← current_frame
while (upper_bound ≤ current_frame + history_window)
    do  { if (upper_bound.initialized)
            then { if (upper_bound.first_packet > n)
                     then break
                   else if (upper_bound.first_packet ≤ n ≤ upper_bound.taat_packet)
                     then return (upper_bound)
                 }
          upper_bound ← upper_bound + 1
        }
``` comment: Then, find a lower bound for the frame number.

```
lower_bound ← upper_bound
while lower_bound > current_frame
    do  { if (lower_bound.initialized)
            then { if (lower_bound.last_packet < n)
                     then break
                 }
          lower_bound ← lower_bound - 1
        }
if (upper_bound.initialized and upper_bound.first_packet - 1 = = n)
    then return (upper_bound - 1)
else if (lower_bound.initialized and lower_bound.last_packet + 1 = = n)
    then return (lower_bound + 1)
else
    then return $\left(\left\lfloor \frac{\text{lower\_bound} + \text{upper\_bound}}{2} \right\rfloor\right)$
```

Distortion is estimated using one or more of a variety of characteristics and approaches. In one embodiment, a peer-based packet scheduler uses characteristics of the GOP structure to determine which missing frame has the highest contribution to the total expected distortion. The importance of missing frames is compared by computing the expected video quality associated with the receipt of each of the missing frames. That is, where a particular frame has a higher expected effect on video quality than other frames, for packets in a particular queue, those packets associated with the higher effect on quality are scheduled for transmission (or here, retransmission) before other packets in the queue.

In some implementations, the importance of packets to be retransmitted is determined and used with a scheduler (e.g., prioritization engine 140) for scheduling the retransmission of packets as follows. A previous frame concealment approach is used (e.g., as described further below), and frames are frozen until the next decodable frame. Given a set of received frames, one of the missing frames, k, and the encoding structure of the video, the scheduler constructs a function $c_k(s)$ which indicates, based on the state of the current decoder buffer, which frame will be shown at the time Frame s is due. Letting $D(s, c_k(s))$ denote the distortion resulting from showing Frame $c_k(s)$ instead of Frame s, and associating each display outcome is associated with the appropriate distortion value, the resulting video quality is computed over several frames (e.g., the two following GOPs) as indicated in Equations 5.2 and 5.3:

$$D_k = \sum_s D(s, c_k(s)) \quad (5.2)$$

The most important frame to request for retransmission is simply:

$$k^* = \text{Arg min}_k D_k \quad (5.3)$$

Retransmission requests are sent out from requesting peers (descendent peers) to their parent sources (parent peers), packet by packet, in order of importance, according to this metric.

As the peers do not know the exact properties of the video sequence they are receiving, a generic function $D(s, c(s))$ is computed by averaging the results from different sequences and is stored at each of the peers. The function $D(s, c(s))$ depends on the difference s−c(s) and captures the increase in terms of MSE resulting from using a frame that is farther away for concealment.

As discussed above, various example embodiments are directed to the adaptive insertion of SI frames to facilitate video quality, by requesting SI frames on an as-needed basis to mitigate and/or stop decoding errors. In these embodiments, peers receiving a request for an SI frame from a descendent create an SI frame using a corresponding received and correctly decoded SP frame to generate the corresponding SI frame, and send the generated SI frame to the requesting descendent. The SI frame is used adaptively to mitigate or stop frame freezes that one or more descendants might be experiencing. Referring to FIG. 1B, such an SI frame insertion approach is implemented at any level of the multicast tree as long as SP frames are received.

In some embodiments involving SI requests, the transmission of control messages from peers is restricted to mitigate or avoid unnecessary congestion on the uplink of the peers, which could delay the video traffic being relayed. An extra field is included in the hello-reply message, the field containing a list of SI pictures regenerated by a peer which are yet to be played out. Based on this information, and on the free uplink bandwidth of the parent which is also indicated in the hello-reply message (e.g., as elsewhere described herein), after a P or an SP frame is lost, a peer selects an SI picture to request and a parent that has enough resources to forward it, entirely, by its playout deadline. The request is included in a special control packet. If the process fails, it is repeated periodically until frame freezes stop.

In some applications, a (parent) peer transmits some SP video packets to its descendants during frame freeze periods, such as when the parent of a peer leaves but its descendants on another tree are not affected by the disconnection. In this case, even though a peer may require an SI picture to recover from decoding errors, its descendants expect to receive SP packets. Hence, even though SI frames are only transmitted when necessary, SP packets are forwarded despite the redundancy and congestion this creates.

In connection with another example embodiment of the present invention, throughput is managed to ensure that an appropriate amount of throughput is available for the transmission of video to peers. The average uplink throughput for a particular peer is held above the source rate (i.e., by controlling tree structure and child connectivity), and enough available throughput is managed to support at least one extra peer on each of the trees. In one implementation, child connectivity is managed to limit the attachment of low bandwidth peers at the base of the tree.

A variety of approaches (i.e., protocols) for controlling the establishment of one or several multicast trees for peer-to-peer delivery are implemented in connection with various example embodiments of the present invention, including those described above, as well as those shown in the figures, such as in FIG. 1A and FIG. 1B. The following description, with reference to FIGS. 2-14 and otherwise, characterizes one or more such example embodiments involving the distribution of a video stream to a population of peers using peer-to-peer multicast. In the architecture presented, the video streaming protocol and the control protocol are independent except for a few parameters exchanged between them.

Figure 2:
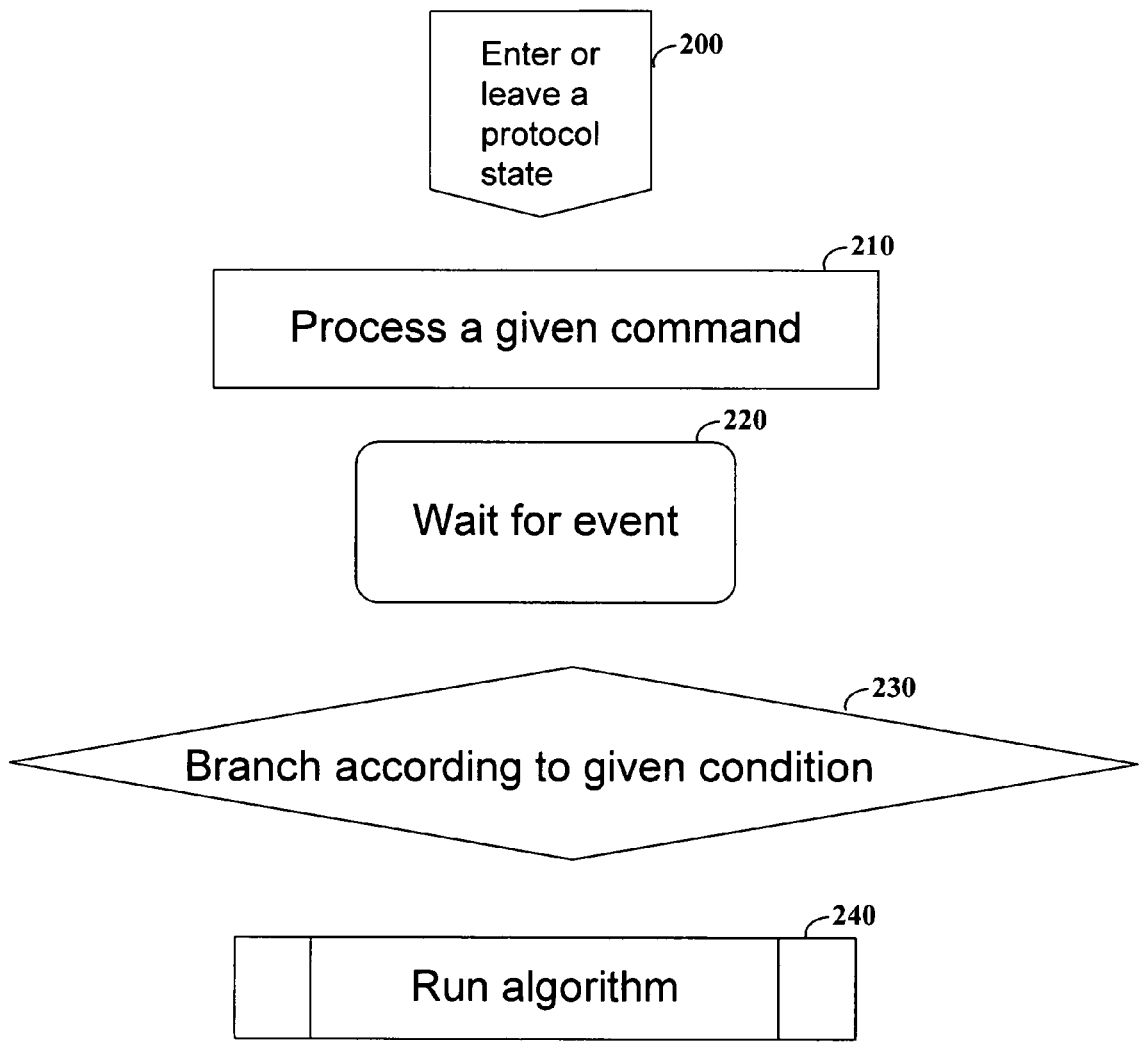
FIG. 2 shows a protocol state diagram, according to another example embodiment of the present invention.

FIG. 2 shows a flow diagram for an approach to implementing a control protocol for a peer-to-peer multicast approach, according to another example embodiment of the present invention. The control protocol is run by each peer wishing to participate in the multicast session. The design of the protocol distinguishes between two hierarchical levels. The first level corresponds to the peer and how it transitions between different states (this level is denoted by the term "peer" in the following), and the second level corresponds to the connections the peer maintains to each of the multicast trees it will join to receive the full video stream (this level is denoted by the term "tree connection"). At block 200, a peer enters or leaves a protocol state. A given command is processed at block 210, and the peer then waits for an event at block 220. The peer then branches (e.g., relative to a tree structure) according to a given condition at block 230, and a scheduling algorithm is run at block 240 for the scheduling of packets accordingly. The approach shown in FIG. 2 is generally applicable to peer-based packet scheduling in the various examples that follow.

The states in which peers exist include the OFFLINE, JOIN, PROBE and ONLINE states. The peer level is responsible for tasks that have to do with initialization and connection maintenance to facilitate connectivity in the tree structure in which peers communicate for peer-to-peer video delivery. The OFFLINE state corresponds to an inactive peer (e.g., a peer whose personal computer is not connected to the Internet or other packet-based network). The peer can transition to the OFFLINE state from any other state. Upon transition, any connection to other peers of the network is interrupted and the peer is correspondingly unresponsive.

Figure 3:
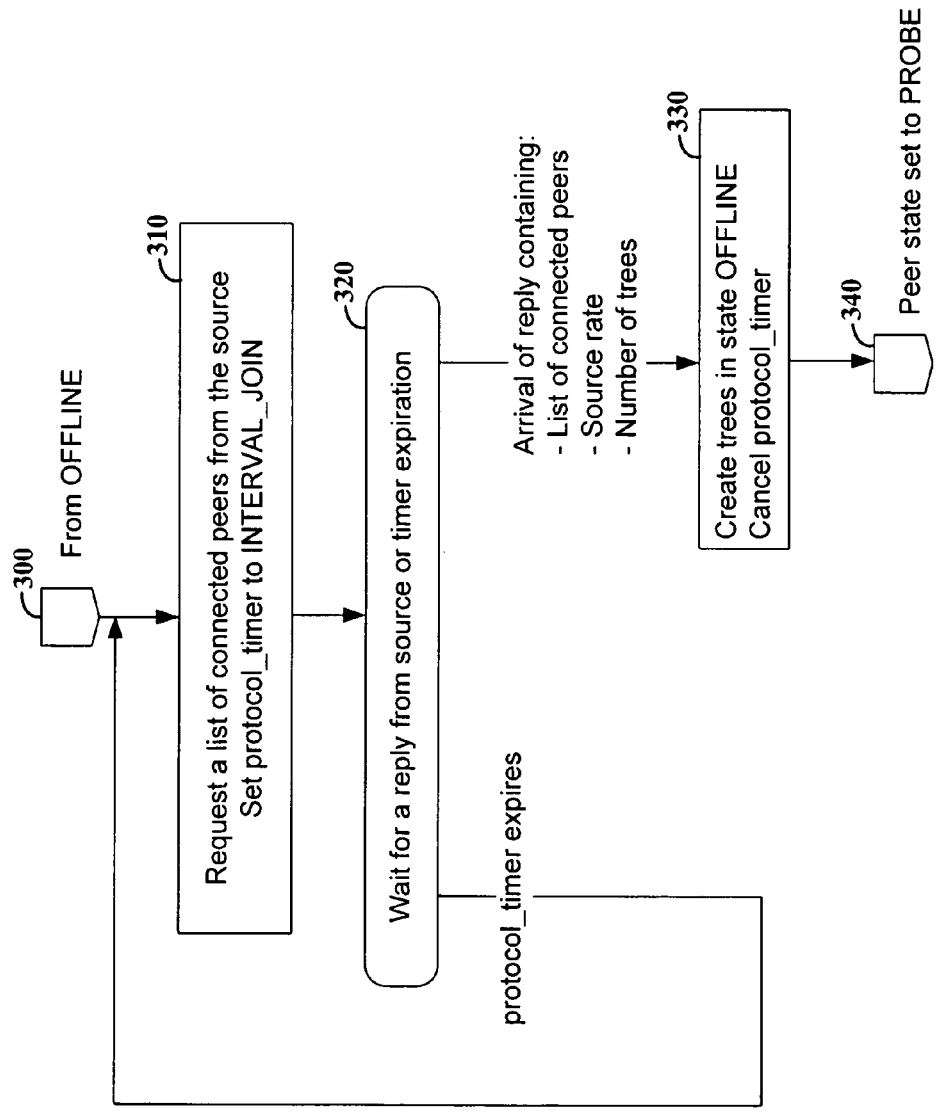
FIG. 3 is a flow diagram for an approach to peer joining operations, according to another example embodiment of the present invention.

FIG. 3 shows an approach to entering a JOIN state, according to another example embodiment of the present invention. At block 300, the peer initiates a transition to a JOIN state from a previous OFFLINE state. At block 310, the peer exchanges a message with a source of a particular multicast to obtain a list of connected peers which it will contact, subsequently, to join the session. At block 320, the peer then waits for a response. The source then transmits the requested list and informs the peer of the number of multicast trees over which the video stream is transmitted, as well as the rate necessary to support the stream. As soon as the reply from the source is received, the peer creates the corresponding number of trees at block 330 and transitions to the state PROBE at block 340. The state of the trees is set to OFFLINE (this state, at the tree level, will be discussed in the following).

Figure 4:
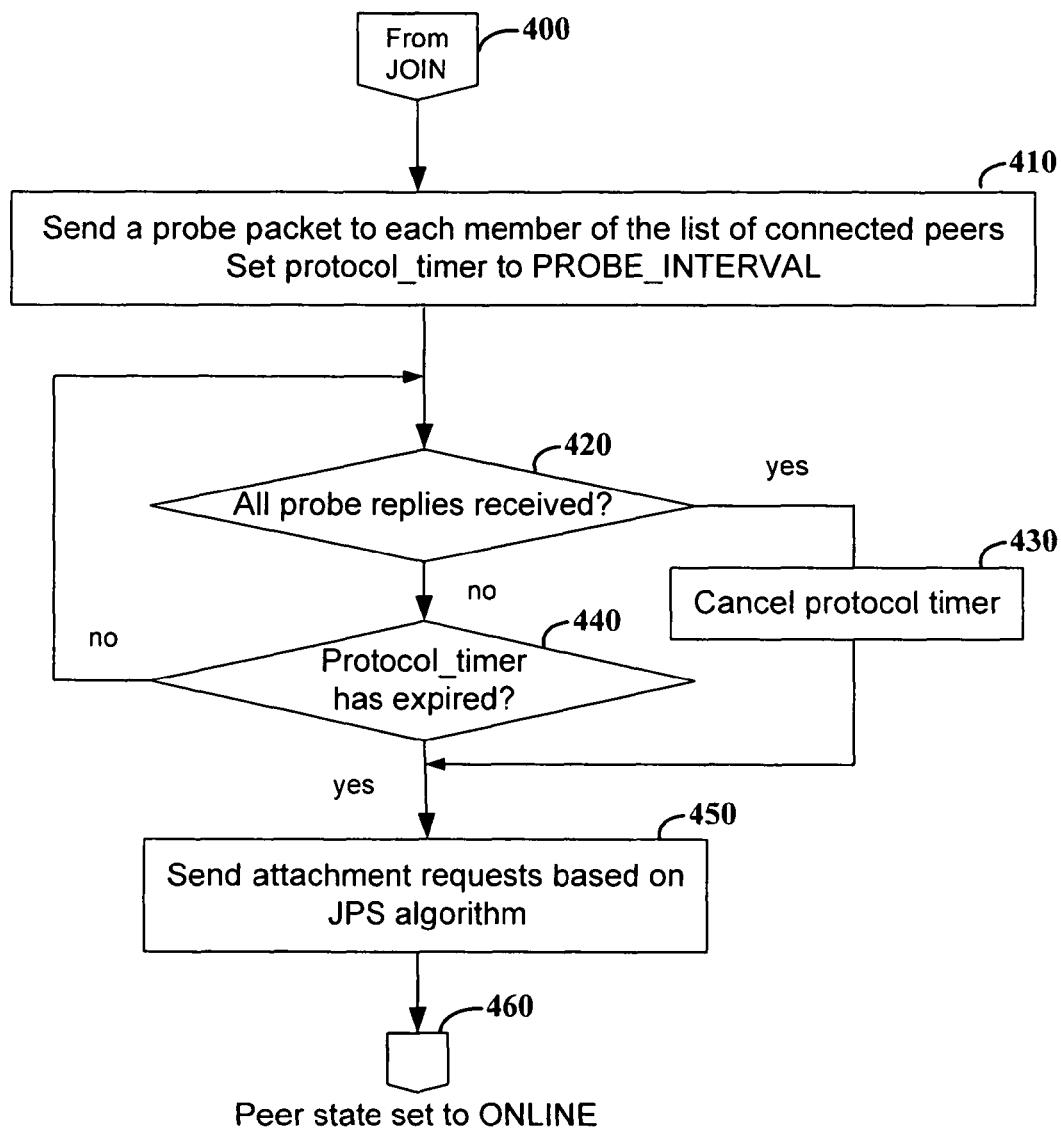
FIG. 4 is a flow diagram for an approach to peer probing operations, according to another example embodiment of the present invention.

FIG. 4 shows an approach to probing, according to another example embodiment of the present invention. At block 400, the peer initiates a transition to a PROBE state from a JOIN state. At block 410, a probing message is sent to all the members of the list of connected peers (e.g., as transmitted by the source in a manner described with FIG. 3). In their replies, peers indicate their available amount of throughput as well as their height in the different multicast trees (i.e., the number of hops separating them from the source).

Generally, the peer waits for replies by checking, at block 420, to see if all probe replies have been received. If all probe replies have been received at block 420, any protocol timer (described in the following) is canceled at block 430. If all probe replies have not been received at block 420, the peer checks to see if a protocol timer has expired at block 440. Such a timer is implemented, for example, to ensure that a peer can move on, based upon expected replies, after a particular time period (e.g., in the event that an identified peer has gone offline or that a reply has been lost).

When all probe replies have been received at block 420, or after a protocol timer has expired at block 440, parents that have enough throughput to support an additional peer connection are selected at block 450, with attachment requests sent in accordance with a selection of a particular parent, and the peer's state set to ONLINE at block 460.

Figure 5:
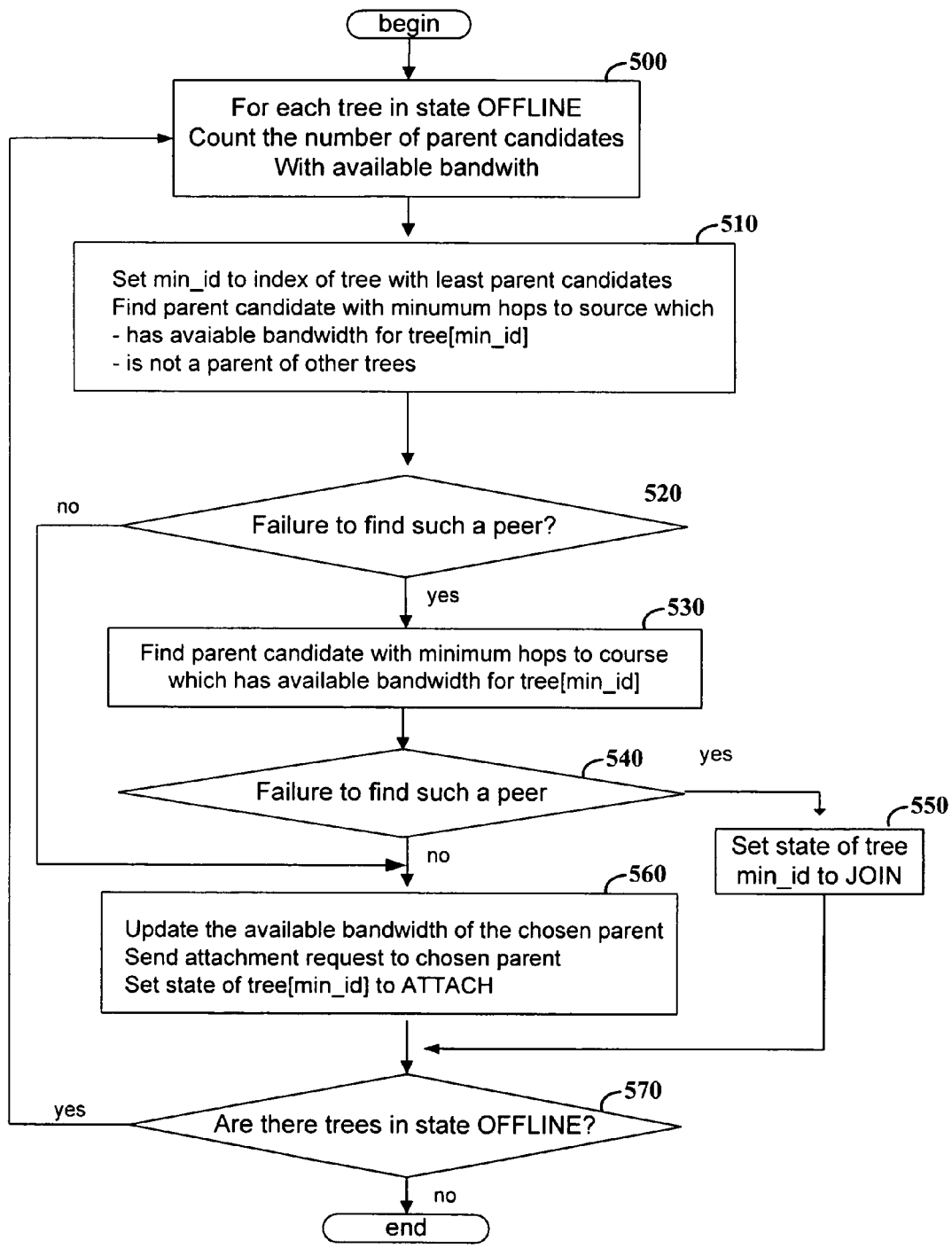
FIG. 5 is a flow diagram for an approach to joint parent selection, according to another example embodiment of the present invention.

In some embodiments, the peer source selection at block 450 is implemented using a Joint Parent Selection (JPS) algorithm as shown in FIG. 5. Each tree is considered iteratively and, if possible, different parents are chosen for the different trees to make use of diversity. At block 500, for each tree in state OFFLINE, the number of parent candidates with available bandwidth is counted. At block 510, a parent with a minimum number of hops (e.g., less than or equal to the number of hops for all other available parents) that also has available bandwidth and is not a parent of other trees is attempted to be selected. Among the parent candidates, the peer will choose the one that is closest to the source in the multicast tree considered, limiting the depth of the trees being constructed. In some applications, peers with the smallest number of candidate parents are considered first to facilitate use of available throughput.

If an appropriate peer has not been found as represented at block 520, (e.g., all such peers are parents of other trees), a parent with a relative minimum number of hops which has available bandwidth is attempted to be selected at block 530. If such a peer is found as represented at block 540, or if such a peer is found at block 510, the selected peer's bandwidth is updated at block 560, an attachment request is sent to the parent, and the state of the tree is set to ATTACH.

If an available parent is not found at blocks 510 or 530, the state of trees for which there is no available parent is set to JOIN at block 550. If there are trees available in state OFFLINE at 570, the process continues at block 510. If no such trees are available in state OFFLINE at 570, the process ends.

In various embodiments, other criteria are considered in connection with the selection of a parent source peer (e.g., at blocks 510 and/or 530). For example, the amount of available throughput, the round-trip time (RTT) or geographical proximity of available parent peers may be considered. In some approaches, an approach focusing upon the building of minimum-depth trees is favored, relative to any minimization (reduction) of the round-trip time (RTT, from a peer to a parent) lead to more stable structures as they increase the average uninterrupted connection time of peers to the multicast trees.

In some applications, once a peer is connected, the different trees operate independently except in the REJOIN state illustrated in FIG. 12 and in the Single Parent Selection algorithm shown in FIG. 11 and discussed below. After the JPS algorithm is run, the peer enters and remains in the ONLINE state until the peer is switched off or otherwise disconnects.

Figure 6:
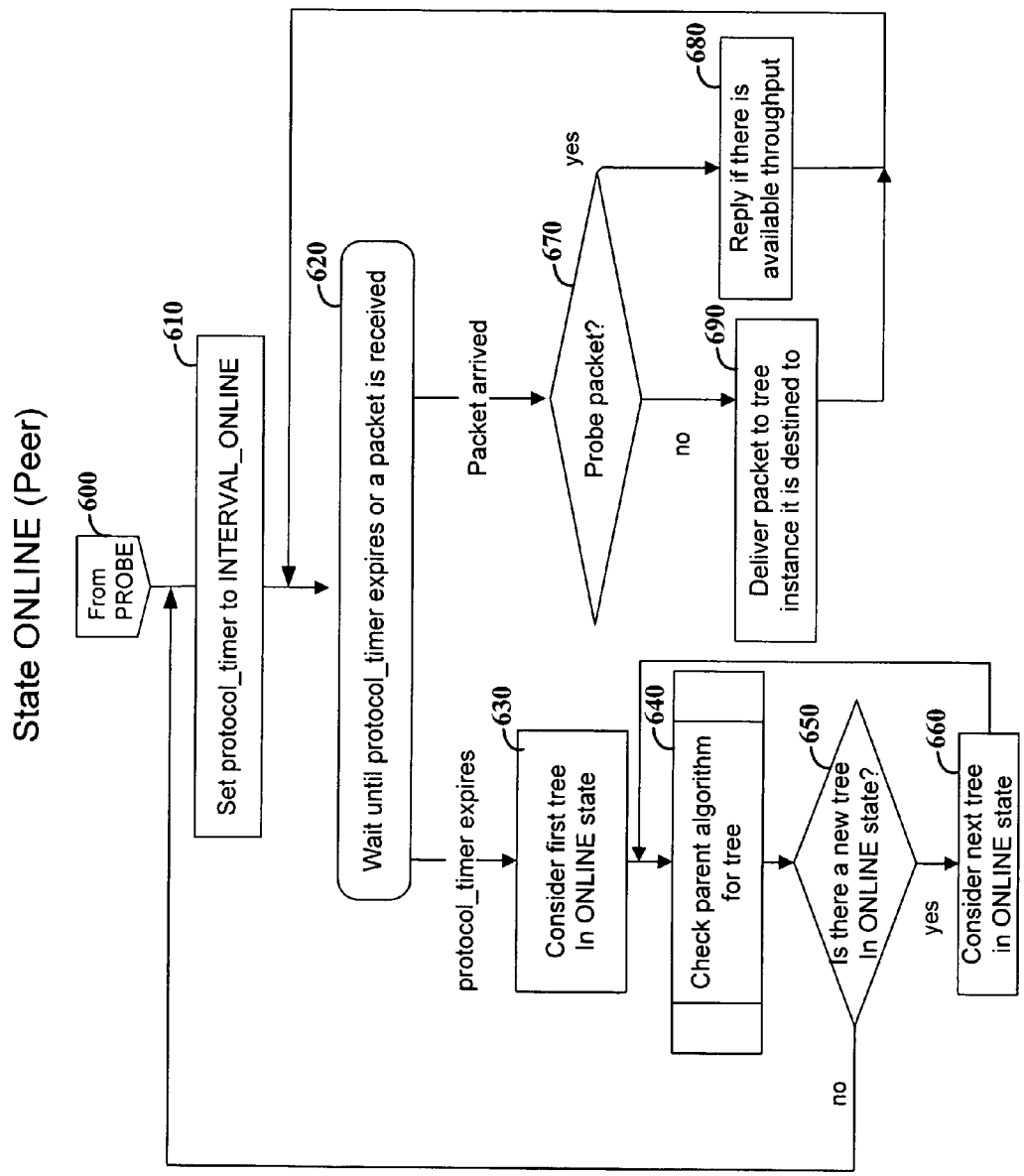
FIG. 6 is a flow diagram for an approach to peer probing operations, according to another example embodiment of the present invention.
Figure 7:
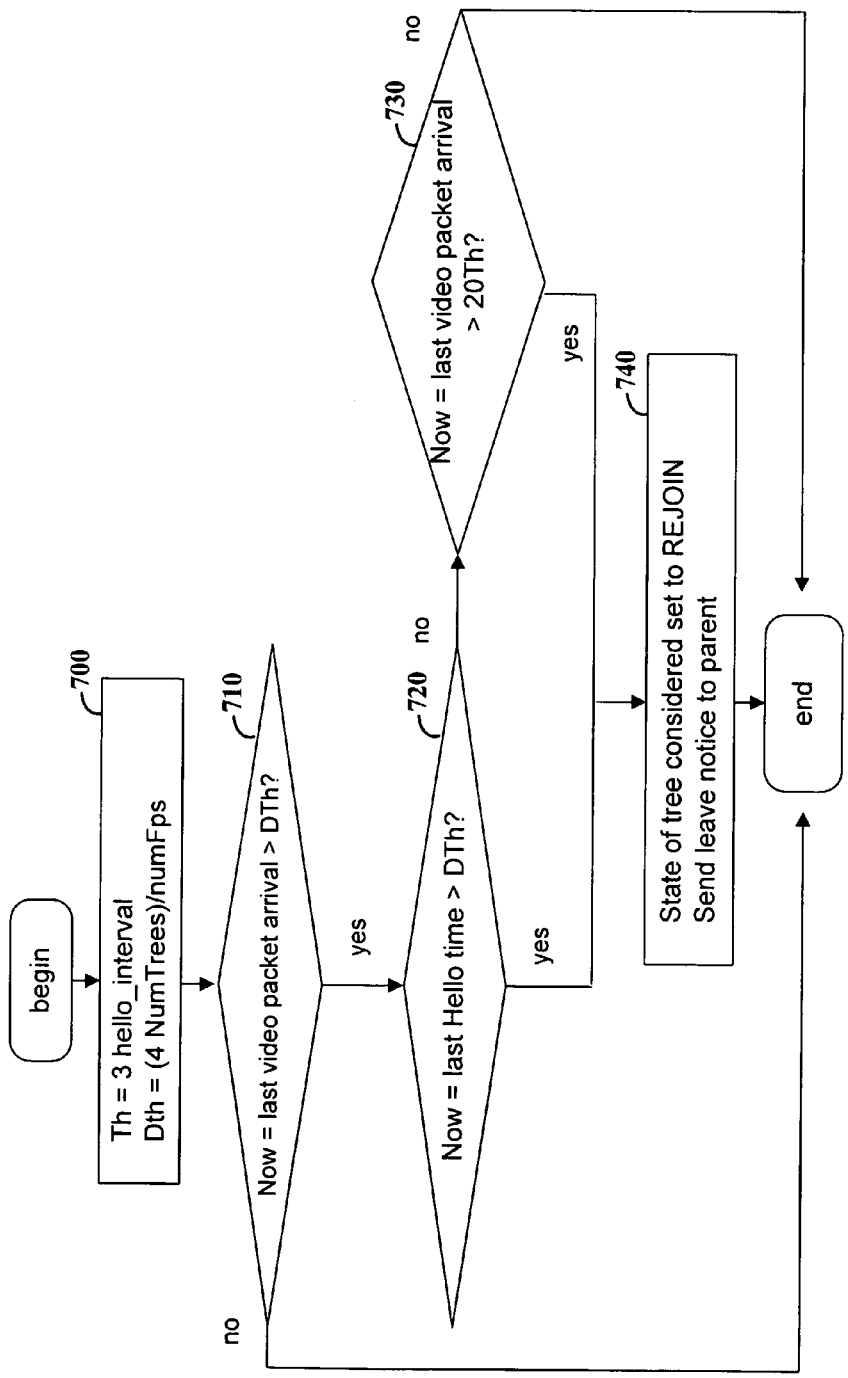
FIG. 7 is a flow diagram for an approach to parent checking operations, according to another example embodiment of the present invention.

FIG. 6 shows an approach to monitoring the connection of the trees to their different parents, according to another example embodiment of the present invention. In some applications, the approach shown in FIG. 6 involves the use of a Check Parent algorithm as shown in FIG. 7. Beginning with FIG. 6, a peer enters an ONLINE state from a PROBE state at block 600, and a protocol timer is set to an interval at block 610. At block 620, the peer waits until either a protocol timer expires or a packet is received.

If the protocol timer expires, the peer considers a first tree in an ONLINE state at block 630. A check parent algorithm is run at block 640 (e.g., in accordance with FIG. 7) to check the parent from which a packet is expected. If there is a next tree available in an ONLINE state as referenced at 650, the next tree in the ONLINE state is considered at block 660, with the process continuing at block 640 with the check parent algorithm. If there is no next tree available as referenced at 650, the process continues at block 610 (while the peer is in the ONLINE state).

If a packet is received at block 620, the peer checks to see if the packet is a probe packet at 670. If the packet is a probe packet, the peer replies at block 680 if there is any available throughput. If the packet is not a probe packet, the peer delivers the packet to a tree instance it is destined to at block 690. After either block 680 or block 690, the peer continues at block 610 (while the peer is in the ONLINE state).

As described above, FIG. 7 shows one example approach to implementing a check parent algorithm, according to another example embodiment of the present invention. Such an approach may be implemented, for example, with block 640 of FIG. 6. Generally, the number of frames per second sent by the video streaming protocol is denoted by numFps, and the number of multicast trees maintained by the protocol is denoted by numTrees. A peer detects disconnections by monitoring the arrival of video traffic and probe responses. To maintain an efficient tree structure, a peer will also disconnect from a parent which responds to probing but does not forward video traffic. In addition, if the connection of one of the trees has failed, its state is set to REJOIN; in this case, the video streaming protocol is informed of the state of the trees to avoid sending packet retransmission requests to disconnected parents.

At block 710, the term Th is set to a limit, shown by way of example as 3 times a hello interval (e.g., a communication interval), and the term Dth is set to another limit, shown by way of example as 4 times the number of trees (4 NumTrees) divided by the number of frames per second (numFps). If the time since the arrival of the last packet is not greater than DTh at 710, the algorithm ends (e.g., the parent is deemed responsive).

If the time since the arrival of the last packet is greater than DTh at 710, the process moves on to check the last hello time. If the time since the last hello is not greater than Th and if the time since the last video packet arrival is not greater than 2 times DTh at block 730, the algorithm ends.

If the time since the last hello is greater than Th at block 720, or if the time since the last hello is not greater than Th at block 720 but the time since the last video packet arrival is greater than 2 times DTh at block 730, the state of the tree is considered set to REJOIN at block 740 and a leave notice is sent to the parent.

Generally as relevant to the above, all packets received by a peer are processed at the tree level except probe messages. In the ONLINE state, if a peer has more available throughput than that required to maintain an additional child on one of the trees, the peer will reply to peer messages by indicating its available amount of throughput and its height in the different multicast trees.

In connection with various example embodiments, a tree connection is in one of six states: OFFLINE, JOIN, PROBE, ATTACH, ONLINE and REJOIN. For example, the tree connection remains in the OFFLINE state between the time it is created and the time a JPS algorithm is run as described above.

A tree connection state is set to JOIN when the JPS algorithm fails to determine a suitable parent candidate for the tree or when attempts to establish a connection to a parent fail in the ATTACH or the REJOIN state (e.g., as described above). In some applications, the set of operations taken to transition from the JOIN state to the PROBE state are almost identical as the ones at the peer level described above, with differences related to the fact that tree connections do not have to be created following the reception of the reply of the source.

Figure 8:
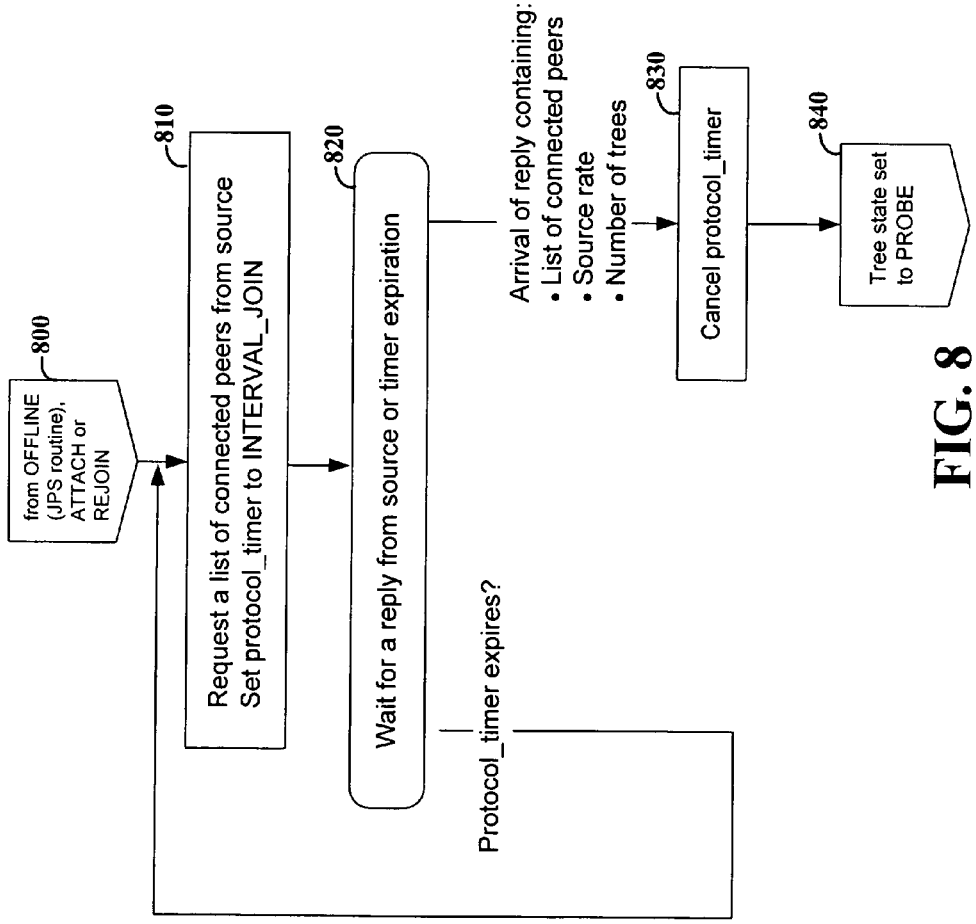
FIG. 8 is a flow diagram for an approach to peer tree joining operations, according to another example embodiment of the present invention.

FIG. 8 shows an approach to facilitating a JOIN state for a tree, according to another example embodiment of the present invention. At block 800, a JOIN state is initiated from one or more of an OFFLINE, ATTACH or REJOIN state. At block 810, a request is sent for a list of connected peers from a source, and a protocol timer (e.g., as described above) is set to a join interval. At block 820, a reply from a source or timer expiration is awaited; if the timer expires, the process continues again at block 800. If a reply arrives (e.g., including a list of connected peers, source rate and number of trees), the protocol timer is canceled at block 830, and the tree state is set to PROBE at block 840.

Figure 9:
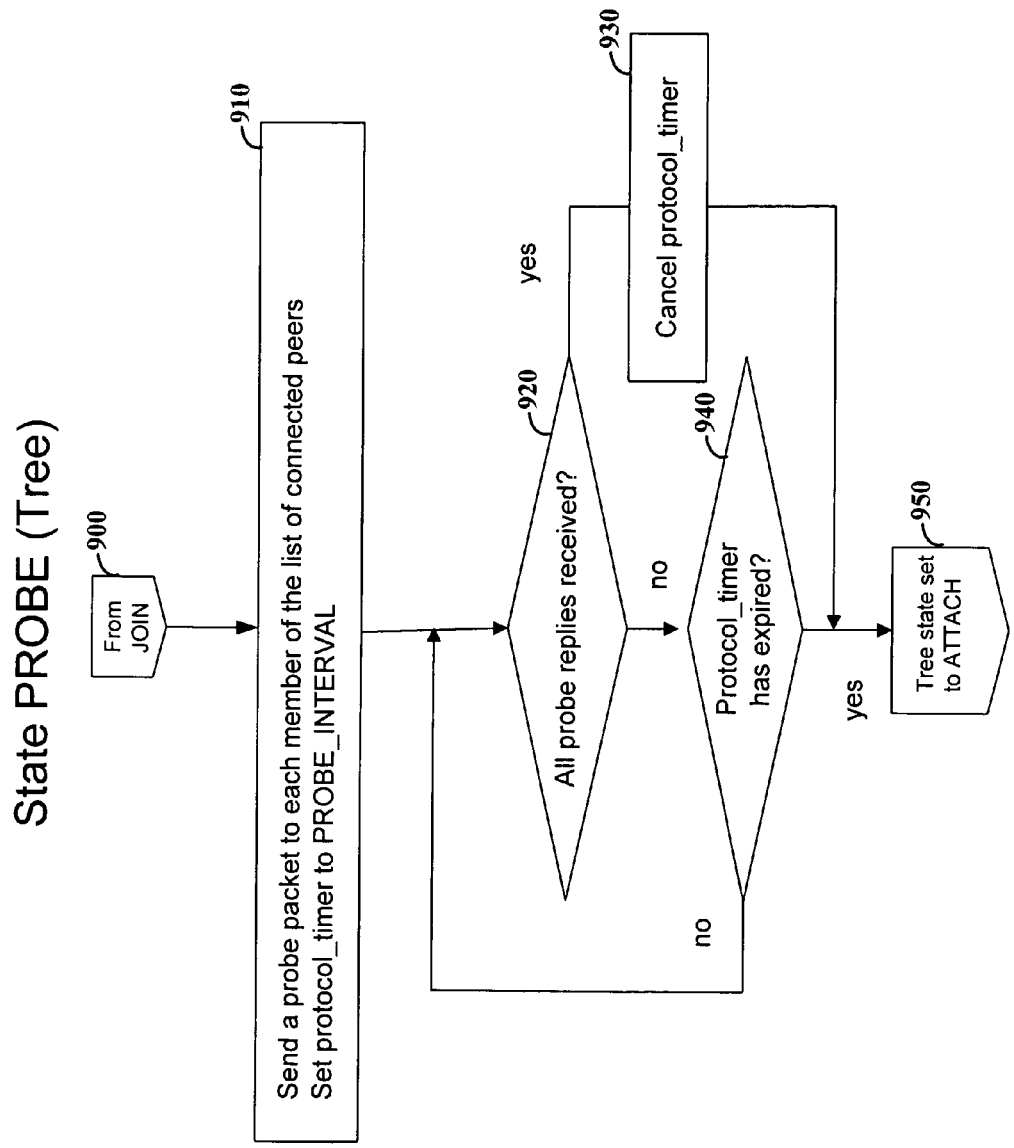
FIG. 9 is a flow diagram for an approach to peer tree probing operations, according to another example embodiment of the present invention.

FIG. 9 shows an approach to facilitating the entrance into a PROBE state from a JOIN state for a tree, according to another example embodiment of the present invention. In the PROBE state, probe messages are transmitted to the different members of the list of connected peers. At block 900, a PROBE state is entered from a JOIN state. At block 910, a probe packet is sent to each member on a list of connected peers and a protocol timer (e.g., as described above) is set to a probe interval.

If all probe replies are received at block 920, the protocol timer is canceled at block 930, and the tree state is set to attach at block 950. If all probe replies are not received at block 920, but the protocol timer has expired at block 940, the tree state is also set to ATTACH at block 950. If all probe replies are not received at block 920, and the protocol timer has not expired at block 940, the process continues, waiting for the receipt of all probe replies or the expiration of the protocol timer before setting the tree state to ATTACH.

Figure 10:
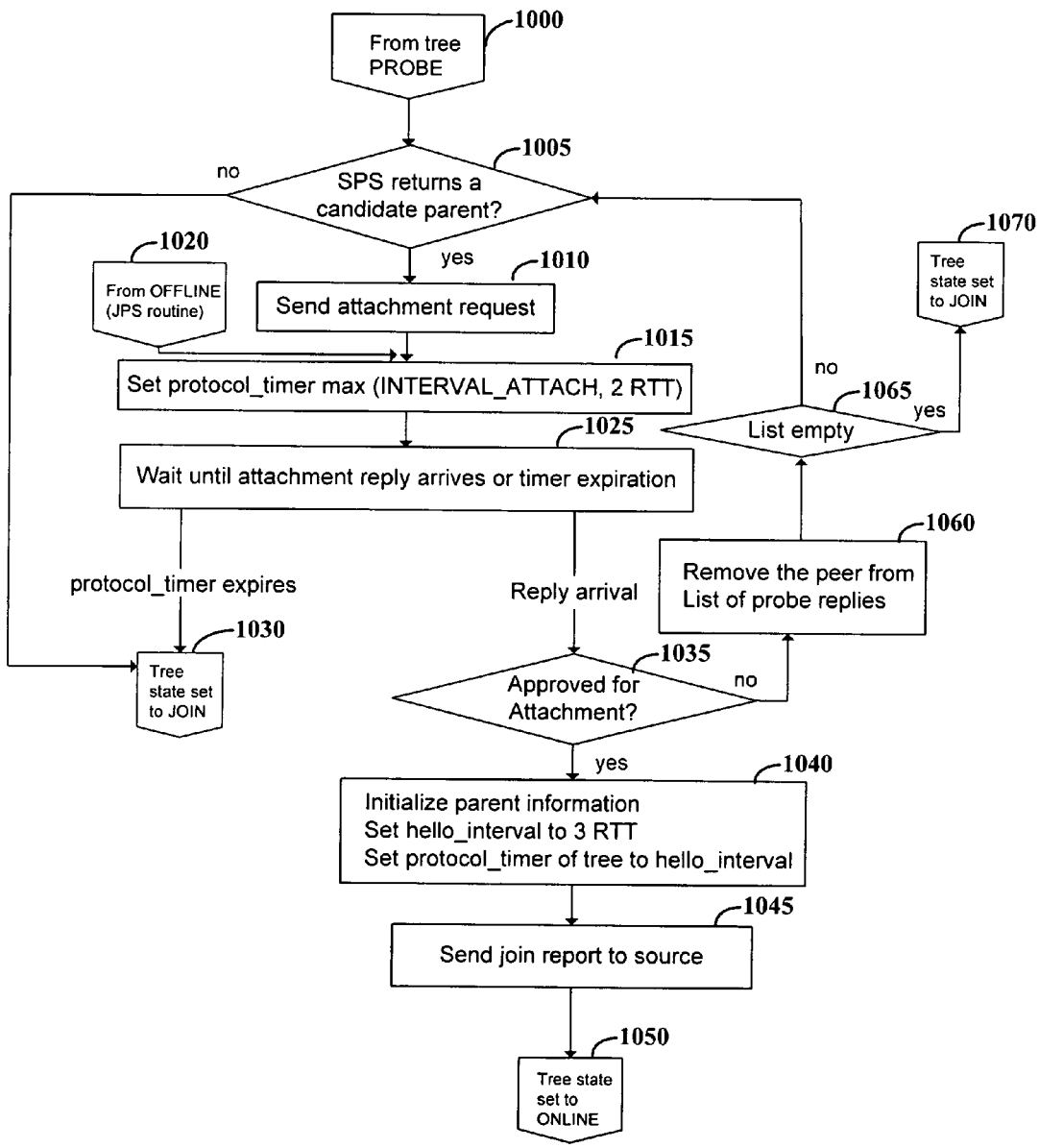
FIG. 10 is a flow diagram for an approach to tree attaching operations, according to another example embodiment of the present invention.

FIG. 10 shows one approach to implementing an ATTACH state, in connection with another example embodiment of the present invention. In the ATTACH state, a suitable parent is determined for a particular tree (and peer). When the tree connection is in the state ATTACH, different candidate parents are iteratively queried for attachment until a successful connection is established. In some applications, candidate parents are either determined by the JPS algorithm as discussed above, or using a Single Parent Selection (SPS) algorithm, such as shown in FIG. 11 and described below, depending upon the state of the tree connection preceding the transition to the ATTACH state.

Beginning with FIG. 10, an ATTACH state is initiated from a PROBE state at block 1000. An algorithm such as the single parent selection (SPS) algorithm in FIG. 11 is implemented to select a parent, and if such a candidate parent is returned at block 1005, an attachment request is sent at block 1010. If such a parent isn't returned at block 1005, the tree state (of the peer requesting attachment) is set to JOIN at block 1030.

If the attachment request is sent at block 1010, or if the peer is returning from an OFFLINE state to an ATTACH state (e.g., implementing a joint parent select (JPS) algorithm), a maximum protocol timer is set at block 1015, and the peer waits until an attachment reply is received or until the timer expires at block 1025. If the timer expires before any attachment reply is received at block 1025, the peer sets its state to JOIN at block 1030.

If a reply is received (before the timer expires) at block 1025, and if the peer is approved for attachment at block 1035, the peer initializes parent information at block 1040 (e.g., setting a hello interval to 3 RTT (3× the round trip time between the peer and the parent)) and accordingly setting a protocol timer to the hello interval. A JOIN report is sent to the source at block 1045, and the tree state of the peer is set to ONLINE at block 1050.

If a reply is received (before the timer expires) at block 1025, but the peer is not approved for attachment at block 1035, the peer is removed from a list of probe replies at block 1060 (e.g., as discussed in connection with FIG. 4). If the list is empty at block 1065, the tree state is set to JOIN at block 1070. If the list is not empty at block 1065, the process continues at block 1005 with another candidate parent. In connection with certain embodiments, a parent peer sending a positive acknowledgment of an attachment includes additional information with the acknowledgement (or in addition to), which is retrieved by the peer and continuously updated in the ONLINE state. The information about the parent, which is maintained by the peer for each tree connection, may include one or more of: the amount of available throughput of the parent, its level in the tree, an estimate of the round-trip-time between the child and the parent, the list of upstream hosts separating the peer and the source in this tree, and the time the last hello message reply was received from the parent.

When entering the ONLINE state at block 1050, the peer sets a protocol timer, which indicates when a hello message should be sent to the parent. It also sends a notice to the source of the multicast indicating it has successfully established a connection to the tree and can serve as a parent candidate for other peers looking to join the session. These aspects may be carried out, for example, before, during or after entry into the ONLINE state at block 1050.

Figure 11:
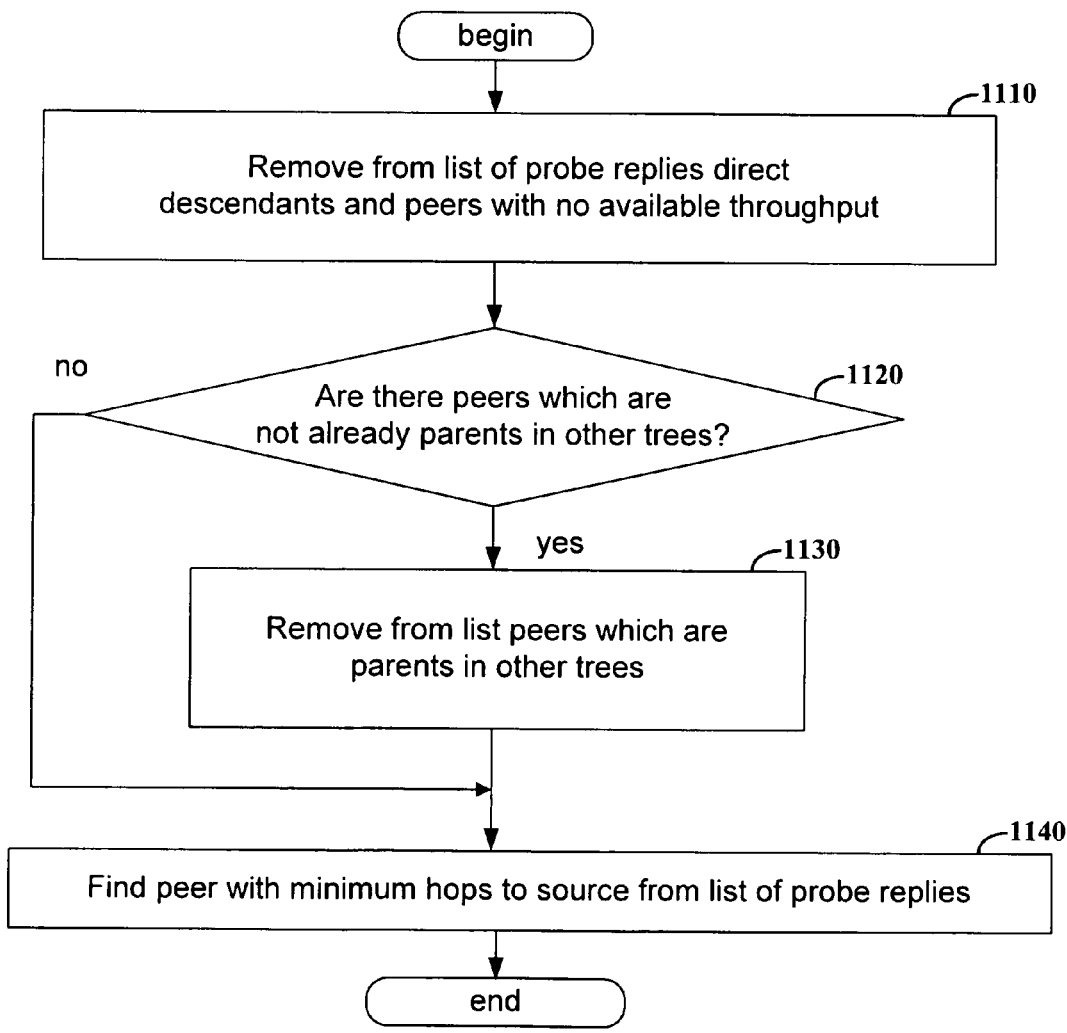
FIG. 11 is a flow diagram for an approach to parent selection operations, according to another example embodiment of the present invention.

FIG. 11 shows a single parent selection (SPS) algorithm for selection of a parent for a particular peer (e.g., run in the ATTACH state when a peer needs to select a suitable parent candidate in one of available trees), according to another example embodiment of the present invention. In some applications, the SPS algorithm facilitates a reduction or minimization of the tree height while maximizing diversity by selecting parents as close as possible to the source which are not parents of the peer in the other trees in a manner similar to, for example, that described in connection with the JPS algorithm in FIG. 5. The approach shown with FIG. 11 may, for example, be implemented in connection with the approaches shown in and described in connection with FIG. 10 and the return of a candidate parent at block 1005.

Using a list of parents providing probe replies to a peer, those parents being direct descendents (of the peer) and/or having no available throughput are removed from the list at block 1110. If there are peers available that are not already parents in other trees at block 1120, any peers which are parents in other trees are removed from the list at block 1130. If there are no peers available that are not already parents in other trees at block 1120, or after block 1130, a peer with a relative minimum number of hops to a source of video is selected from the remaining peers in the list of probe replies at block 1140.

Figure 12:
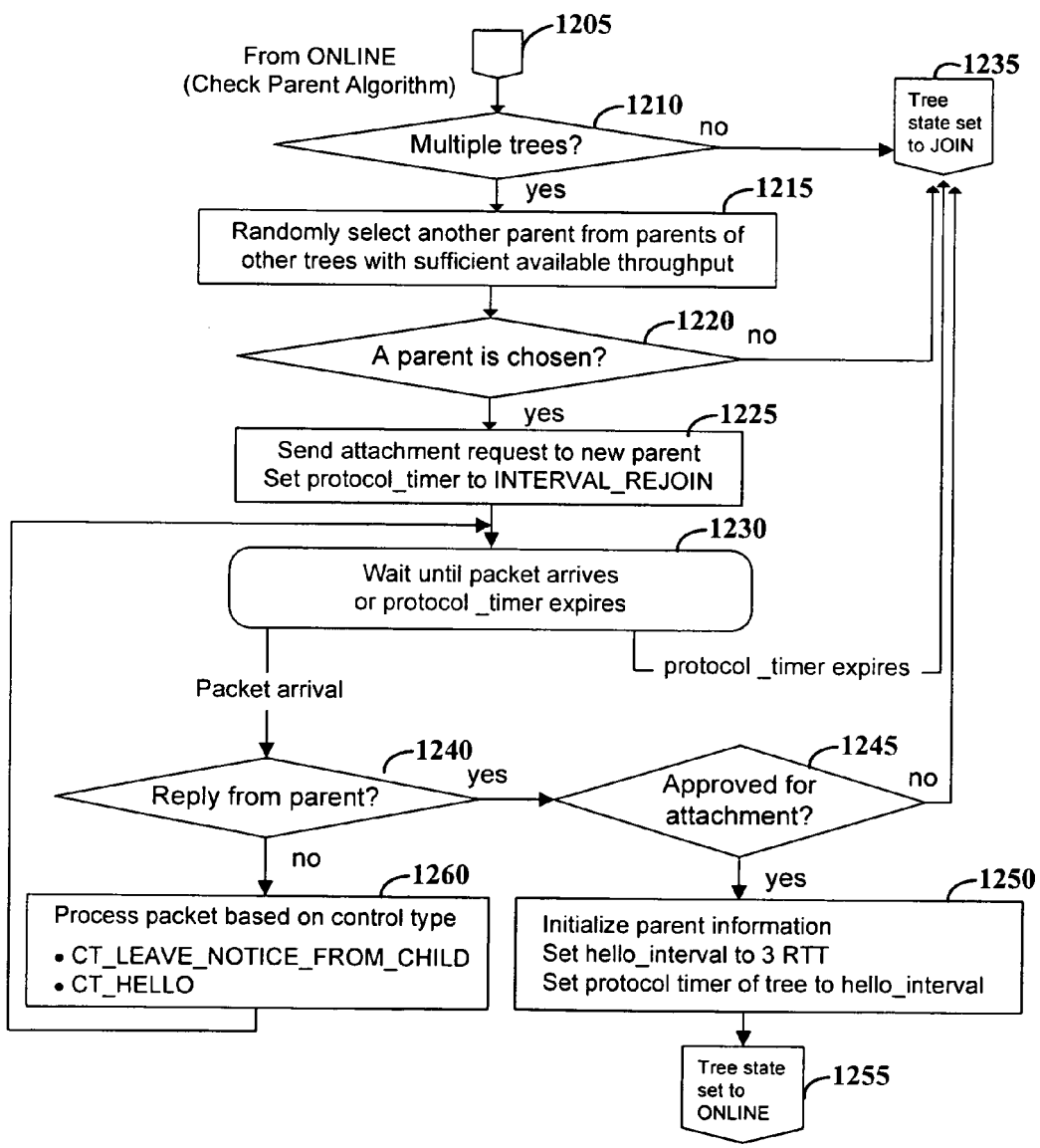
FIG. 12 is a flow diagram for an approach to tree rejoining operations, according to another example embodiment of the present invention.

FIG. 12 shows an approach for peer entrance into a REJOIN state, according to another example embodiment of the present invention. When a peer detects it has lost its connection to one of the trees (e.g., through the check parent algorithm described above with FIG. 7), the peer enters the REJOIN state at block 1205 to re-establish a connection to a parent by choosing one of the remaining parents. If this fast recovery mechanism succeeds, the tree connection state will be set to ONLINE at 1255; if it fails, the tree connection state will be set to JOIN at 1235 and the source will be contacted to obtain a new list of candidate parents.

During the REJOIN state, a peer may respond to other communications in a variety of manners, depending upon the application. In some applications, while the reconnection is implemented as described in the following with FIG. 12, the retransmission requests are issued over the other multicast trees to recover missing video packets. In addition, in the REJOIN state, the peer also processes control packets that it may receive on this tree. Hello messages from its children will be answered and children that decide to disconnect from the peer (e.g., to find another video source parent) will be deleted from the children list when a leave notice message is received. Attachment requests may be ignored.

From block 1205, if there are not multiple trees available at block 1210 (e.g., as previously identified), the tree state is set to JOIN at block 1235. If there are multiple trees available (e.g., two or more, including a tree that has been disconnected) at block 1210, the peer randomly selects another parent from a set of parents from other trees having available throughput at block 1215.

If a parent cannot be chosen at block 1220, the peer sets its tree state to JOIN at block 1235. If a parent is chosen at block 1220, the peer sends an attachment request to the chosen parent and sets a protocol timer to a rejoin interval at block 1225. The peer then waits until either a packet arrives from the parent, or until the protocol timer expires, at block 1230.

If the protocol timer expires before a packet arrives at block 1230, the tree state of the peer is set to JOIN at block 1235.

If a packet is received at block 1230 (before the protocol timer expires), and if the received packet is not from the parent at block 1240, the packet is processed based upon the control type associated with the packet at 1260 (e.g., and as described above with example responses during the REJOIN state), and the process returns to block 1230.

If a packet is received at block 1230 (before the protocol timer expires), and if the received packet is from the parent at block 1240, the peer then responds accordingly, based upon whether the peer is approved for attachment. If the peer is not approved for attachment at block 1245, the peer enters the JOIN tree state at block 1235. If the peer is approved for attachment at block 1245, the peer initializes parent information at block 1250 (e.g., by setting a hello interval and protocol timer, in a manner similar to that described above), and the tree state of the peer is set to ONLINE at block 1255.

Figure 13:
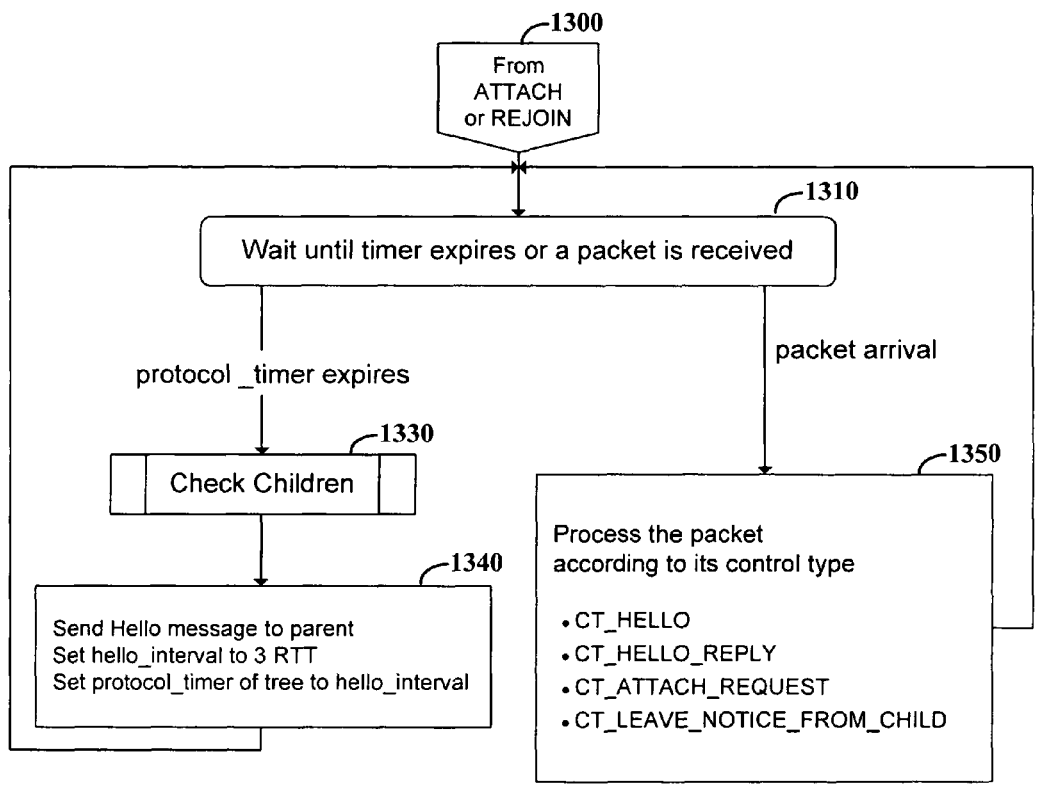
FIG. 13 is a flow diagram for an approach to tree online operations, according to another example embodiment of the present invention.

FIG. 13 shows an approach for implementing an ONLINE state, according to another example embodiment of the present invention. In many applications, except when connections are being (re)established, tree connections remain in the ONLINE state. Generally, a peer enters its ONLINE state from an ATTACH or REJOIN state at block 1300. At block 1310, the peer waits until either a timer expires or a packet is received before taking any action.

If a timer expires (e.g., a protocol timer expires), the peer checks its children at block 1330 and selectively carries out check children functions, and sends a hello message to its parent at block 1340. The hello message is set to an interval (e.g., 3 RTT as shown by way of example) and a timer is set for the hello function (e.g., a protocol timer is set to a hello interval). The process continues at block 1310, with the peer waiting until a timer expires.

If a packet is received at block 1310 (e.g., prior to a timer expiring), the packet is processed according to its control type at block 1350. The ONLINE process resumes at block 1310, again waiting for a timer to expire or a packet to be received.

In connection with FIG. 10 and/or other various embodiments, at the tree connection level, a peer informs its parents of its presence by transmitting periodic "hello" messages at intervals. When a hello message is received, an immediate response intended to confirm the parent's presence is generated. In addition to verifying the connection, these messages may also be used to exchange information between two neighboring peers.

In some applications, each child includes in its messages to a parent the size of the subtree below it. This number is aggregated from the bottom of the tree to the top and it is used to prioritize video streaming (e.g., with the prioritization engine 140 in FIG. 1A). Based on the exchange of hello messages, the child estimates the round-trip-time to its parent, using a moving average. By way of example, the previous estimated round-trip-time is denoted by $RTT_{stored_{old}}$, the latest round-trip-time measurement is denoted by $RTT_{new}$ and the new estimated round-trip-time by $RTT_{stored}$, which is estimated for certain embodiments as follows:

$$RTT_{stored} = 0.7 RTT_{stored_{old}} + 0.3 RTT_{new}.$$

In some applications, when replying to a hello message, parents transmit their available throughput and the list of peers separating them from the source. This ensures that a host does not reconnect to one of its descendants when it is disconnected from a multicast tree.

When an attachment request is received and there is enough available throughput, the requesting peer becomes a child on the corresponding multicast tree. Information such as its address, its number of descendants and the last time a hello message has been received is initialized. A reply message is sent back to the peer indicating whether or not the attachment has been successful. Generally, the available throughput of the peer is decreased by the source rate divided by the number of multicast trees.

Figure 14:
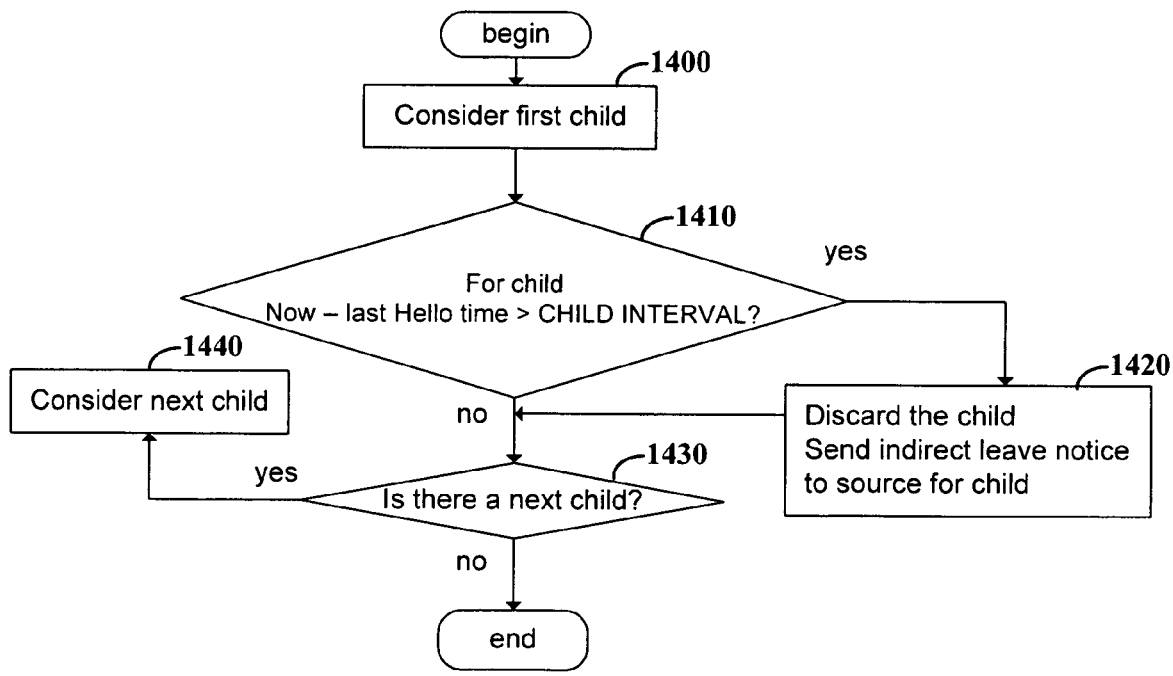
FIG. 14 is a flow diagram for an approach to check children operations, according to another example embodiment of the present invention.

FIG. 14 shows one approach for a peer checking the presence of its children, according to another example embodiment of the present invention. The approach shown in FIG. 14 may, for example, be implemented in connection with the check children approach at block 1330 with FIG. 13.

At block 1400, a first child in a list of children is considered, with subsequently-assigned "next" children correspondingly considered (relative to block 1440, discussed in the following). For the child being considered, if the time since the last hello is greater than a set child interval time (e.g., a time period during which a hello message from a child is expected) at block 1410, the child is discarded at block 1420 and a child leave notice is sent to the source for the particular child so the source can purge the child from its list of connected peers or otherwise update its information accordingly. If the time since the last hello is not greater than a set child interval time at block 1410, or after a child is discarded at block 1420, the process continues if there is another child at block 1430 with a next child considered at block 1440. If all children have been checked (i.e., there are no "next" children at block 1430), the process ends. In some applications, since the penalty of a false child leave detection is high, a relatively longer time interval is used (on the order of a few seconds) for the child interval at block 1410.

In connection with various example embodiments as described herein, discussion is made for different peers as one or more of a parent, a child or a source. In different contexts, the peers described herein are applicable for implementation as one or more of these different peers. Considering a source peer (e.g., one of parent sources 120-N in FIG. 1A), in various example embodiments, the source shares most and/or all of the functionalities of the peers described above and/or in connection with other peers to which the source distributes media. The source is continuously in the ONLINE state, both at the peer and at the tree connection level, and processes probe messages, attachment requests, leave notices and hello messages in the same way as the other members of the session.

In addition, the multicast source is responsible for maintaining and transmitting the list of peers connected to the session. The source adds new peers to the list of participating peers when a peer (or a parent of a peer) informs the source of the successful establishment of a connection to one of the trees. Peers are deleted when a parent peer detects and/or is notified that a child has left, and in turn notifies the source (e.g., as described with FIG. 14 above).

In some embodiments, the overhead created by peers in the probing state, when probing messages are sent out to discover parent candidates, are controlled by the source by adjusting the size of the list sent to joining peers (e.g., at block 310 of FIG. 3) according to the current group size and the number of multicast trees. At the beginning of a session, the group size is small and the list size corresponds to the group size. When the group size reaches a certain point, the list size increases logarithmically. For multiple trees, the source sends a larger list to allow a joining peer to better exploit path diversity. The exact size of the list, Ls, as a function of the number of connected members n and the number of trees numTrees is represented as:

$$Ls = n, \text{ if } n < 3\,numTrees$$
$$= \lfloor 5 \ln(n - (5\,numTrees - 3)) + 3\,numTrees - 5\ln(5) + 0.5 \rfloor,$$

otherwise.

In connection with various example embodiments, timers are used in different contexts relative to tree connectivity for a particular peer. Various examples of timer settings are given above, including many in connection with one or more of FIGS. 2-14. For example, Table C.1 indicates different example time intervals which can be used in connection with various example embodiments. These intervals may, for example, be used to detect that the source or another peer has ignored a message in the JOIN, PROBE and ATTACH states, when a 0.5s interval has passed. When a peer is rejoining, this interval may be larger, depending on the round-trip-time estimate. The connection state of the parents is checked 30 times per second. Finally, a child is considered to have left the multicast when it does not send hello messages for more than 2.0 seconds.

TABLE C.1

Timer and time threshold settings.

| | |
|---|---|
| INTERVAL_JOIN | 0.5 s |
| PROBE_INTERVAL | 0.5 s |
| INTERVAL_ATTACH | 0.5 s |
| INTERVAL_REJOIN | max (0.5 s, 3RTT + 0.3 s) |
| INTERVAL_ONLINE | 0.033 s |
| CHILD_INTERVAL | 2.0 s |

A variety of protocol packet sizes, and information associated with packet types, are implemented in connection with different example embodiments of the present invention. Table C.2 shows example sizes of different control packets that can be used for one or more of the example peer-to-peer embodiments described herein.

TABLE C.2

Sizes of different packet types.

| | |
|---|---|
| LIST_REQUEST | 40 bytes |
| LIST_REQUEST_REPLY | 120 bytes |
| ATTACH_REQUEST | 40 bytes |
| ATTACH_REPLY | 80 bytes |
| JOIN_REPORT | 40 bytes |
| LEAVE_NOTICE | 40 bytes |
| HELLO | 40 bytes |
| HELLO_REPLY | 40 bytes |
| PROBE | 40 bytes |
| PROBE_REPLY | 80 bytes |

In various embodiments, the packet types described with Table C.2 are implemented with a protocol running over a UDP/IP protocol stack. The size of the headers is 8 and 20 bytes, respectively. All of the messages include a packet type field to be identified by the receivers (this can be signaled in less than 4 bits). The LIST REQUEST, JOIN REPORT and PROBE messages do not necessarily require any other information, as the protocol can take advantage of the information included in the IP and UDP header. The ATTACH REQUEST and LEAVE NOTICE messages indicate, in addition, the tree they are destined to (4 bits). For all these messages 40 bytes are used to encode the transmitted information.

LIST REQUEST REPLY messages indicate the addresses of the different members of the list of connected peers. They also indicate the source rate and the number of trees. Depending on the size of the list transmitted by the source (i.e., between 1 peer and 55 peers), the size of this packet can vary between 50 and 500 bytes (8 bytes per IP address and 40 bytes for additional information including headers).

PROBE REPLY messages include their height in the different trees (4 bytes), and the available throughput of the peer (this can be encoded with 1 kb/s precision with 10 bits).

ATTACH REPLY messages contain the result of the attachment (1 bit), the tree they belong to (4 bits), the available throughput of the peer (this can be encoded with 1 kb/s precision with 10 bits), and the addresses of peers between the source and them. When these packets are implemented at 80 bytes long, enough space is made available for 6 peers.

HELLO messages indicate the tree they are destined to (4 bits), the number of descendants of a peer (2 bytes) and the round-trip-time between the peer and the parent (1 byte for round-trip-times between 1 ms and 256 ms, with 1 ms precision).

HELLO REPLY messages include the available throughput (10 bits), the tree they are destined to (4 bits), their height in the tree (4 bits), and the addresses of peers between them and the source. These addresses are first sent in the ATTACH REPLY message; they are transmitted when a change occurs. In many applications, both HELLO and HELLO REPLY messages are encoded with 40 bytes.

While the present invention has been described with reference to several particular example embodiments, those skilled in the art will recognize that many changes may be made thereto without departing from the spirit and scope of the present invention. Such changes may include, for example, implementing the approaches described herein in different packet-based networks or in networks such as telephone networks, satellite networks or networks that include non-packet-based communications. Other changes may involve, for example, the use of different communications protocol approaches, various other packet-based communications devices such as telephones, personal computers, video display devices. Still other changes may involve the implementation of functions, such as algorithms, peer control functions or peer communications functions, at devices that may be separate from a particular peer, or otherwise implemented separately from other peer functions (e.g., audio or video functions). These and other approaches, including those described in the claims below, characterize example aspects of the present invention.

What is claimed is:

1. A system for communicating packetized video over a peer-to-peer packet-based network using packet-by-packet video transmission scheduling, the system comprising:
    a video source configured to provide a packet-based video stream to the peer-to-peer packet-based network;
    a plurality of peer packet-based devices arranged to form a plurality of peer-to-peer trees and coupled to the peer-to-peer packet-based network to receive and display video packets, to send video packets to other peers in the peer-to-peer packet-based network; and wherein the video source and the plurality of peer packet-based devices are configured to facilitate video communications for passing video data from the video source to the plurality of peer packet-based devices in a packet stream by mapping each video packet to a corresponding peer-to-peer tree of the plurality of peer-to-peer trees;

assigning relative priorities between packets in the packet stream based upon an effect of the packets in the packet stream upon a quality of video at the plurality of peer packet-based devices and upon a number of peers that the packets are to be subsequently delivered;

processing each packet in the packet stream in order of their priority relative to other packets in the packet stream;

temporally spacing the packets in the packet stream to mitigate congestion on the peer-to-peer packet-based network; and transmitting the temporally spaced packets.

2. The system of claim 1, wherein the video source and the plurality of peer packet-based devices are further configured to facilitate video communications for passing video data from the video source to the plurality of peer packet-based devices by determining a packet to deliver as a function of an importance level assigned to packets in a delivery queue.

3. The system of claim 1, wherein processing selected packets includes ranking certain ones of the selected packets, each packet's rank being based on a number of frames affected if the frame that the packet belongs to is incorrectly decoded.

4. The system of claim 1, wherein processing selected packets includes ranking the packets based on a number of peers that are children of a respective peer to which the packets are to be delivered.

5. The system of claim 1, wherein the video source and the plurality of peer packet-based devices are further configured to facilitate video communications for passing video data from the video source to the plurality of peer packet-based devices by determining a packet to deliver as a function of a video frame type and of the order in the group of pictures (GOP) associated with packets to be delivered.

6. The system of claim 1, wherein the video source and the plurality of peer packet-based devices are further configured to facilitate video communications for passing video data from the video source to the plurality of peer packet-based devices by assigning a priority to the packets that is based upon their effect upon the quality of the video stream as displayed at the plurality of peer packet-based devices.

7. The system of claim 1, wherein the video source and the plurality of peer packet-based devices are further configured to facilitate video communications for passing video data from the video source to the plurality of peer packet-based devices by assigning a priority to the packets that is based upon estimated video distortion.

8. The system of claim 1, wherein the plurality of the peer packet-based devices are configured to join each of the plurality of peer-to-peer trees and to accept one or more child peers for each of the plurality of peer-to-peer trees, wherein different portions of the video stream are communicated over different and respective peer-to-peer trees of the plurality of peer-to-peer trees and to connect to each of the peer-to-peer trees to receive the different portions of the video stream from the different peer-to-peer trees and wherein the video source and the plurality of peer packet-based devices are further configured to facilitate video communications for passing video data from the video source to the plurality of peer devices by processing and temporally spacing packets as a function of the topology of the peer-to-peer packet-based network and a bandwidth capacity of a receiving peer device.

9. The system of claim 1, wherein the video source and the plurality of peer packet-based devices are further configured to facilitate video communications for passing video data from the video source to the plurality of peer packet-based devices by temporally spacing the packets in the packet stream consistent with a traversal time for a previous video packet to traverse an uplink of another peer.

10. The system of claim 1, wherein each peer packet-based device that receives and displays a video packet stream is configured to pass video data to another peer packet-based device by temporally spacing the packets in a packet stream sent to the other peer packet-based device as a function of the temporal spacing of packets in the video packet stream that were previously received at said other peer packet-based device.

11. The system of claim 1, wherein the plurality of peer packet-based devices are configured to approximate an importance level of packets in a delivery queue and to stream the packets to other peer packet-based devices in accordance with the approximated importance level.

12. The system of claim 1, wherein each of the plurality of packet-based peer devices is connected to receive packets from at least two different packet-based peer devices and is configured to request retransmission of missing packets in a packet stream, as a function of an importance level assigned to the missing packets, from a peer packet-based device that is different than a peer packet-based device that provided the packet stream having missing packets.

13. The system of claim 1, wherein the video source is one of the plurality of peer packet-based devices.

14. The system of claim 1, wherein the plurality of peer packet-based devices include a peer packet-based device arranged as a parent device in a network tree, relative to other peer packet-based devices arranged as child devices in the network tree, and wherein the parent device is configured to
estimate congestion distortion for delivery of the packet-based video stream to the child devices,
assign a priority to the packets of the packet-based video stream that is based upon the estimated congestion distortion, and
deliver a stream of the packets to the child devices in accordance with the assigned priority.

15. A packet-based peer device for relaying received packetized video over a peer-to-peer packet-based network using packet-by-packet video transmission scheduling, the packet-based network having an ancestral tree structure including at least two peers to which the packet-based peer device streams the packetized video, the packet-based peer device comprising:
a queue configured to store complementary portions of a packetized stream of video that are each mapped to a respective and different peer-to-peer tree of a plurality of peer-to-peer trees;
a prioritization engine configured to prioritize packets in the queue as a function of the number of video frames of a video transmission that would be adversely affected by non-receipt of the packets and characteristics of the ancestral tree structure that include parent-child relationships between peers of the plurality of peer-to-peer trees; and
a packet processing engine configured to deliver the packetized stream of video to the at least two peers in response to the prioritization of the packets and according to the mapping to the plurality of peer-to-peer trees.

16. The device of claim 15, wherein the packet processing engine further temporally spaces the packets in the packetized stream of video as a function of the temporal spacing of the received packetized video.

17. The device of claim 15, wherein the packet-based peer device is programmed and configured to send packets to other peer devices as a function of the number of peers to which the packets are to be delivered.

18. The device of claim 15, wherein
the packet-based peer device is connected to receive packets from at least two different peers,
the prioritization engine is programmed and configured to prioritize different peer descendents to which the device streams the packetized video, and wherein the packet processing engine delivers packets to the peer descendants as a function of the prioritization of each descendant, and
the packet processing engine is configured, responsive to missing packets in a video stream provided by a peer device, to request retransmission of the missing packets from a different peer device.

19. The device of claim 15, wherein the device is a personal computer programmed with functionality for implementing the prioritization engine and the packet processing engine.

20. The device of claim 15, wherein the prioritization engine is programmed and configured to detect a change in the peers in the ancestral tree structure and to prioritize packets as a function of characteristics of the ancestral tree structure as defined by the presence and connectivity of the peers.

21. The device of claim 15, wherein the device is programmed and configured to
request, from a source of the packetized video, setup data that indicates how multicast trees exist in a peer to peer structure and that includes a list of a plurality of peers in the multicast trees;
receive, from the source, the list of connected peers and a number of multicast trees;
probe the peers in the list of connected peers;
receive reply data from the peers that includes information characterizing the ability of each peer to provide packetized video to the device;
select, for each of the plurality of multicast trees, a peer from the list of connected peers using the reply data; and
attach to the selected peers for each of the multicast trees.

22. The device of claim 21, wherein the device is programmed and configured to provide the packetized video to child peers using a transmission protocol that does not include acknowledgements of receipt of the data from the child peers.

23. The device of claim 21, wherein the device is programmed and configured to send requests for retransmission of lost packets to multiple parents of multiple ones of the plurality of peer-to-peer trees.

24. The device of claim 21, wherein the device is programmed and configured to perform the selection of peers by implementing an algorithm that discourages the selection of the same peer for more than one multicast tree.

25. The device of claim 21, wherein the device is programmed and configured to
select a parent in each peer-to-peer tree as a function of transmission time, via the parent, between a source of the peer-to-peer tree; and
connect and maintain a connection with the selected parents, using a distributed control protocol that allows the peers and the device to self organize into each of the multicast trees.

26. The device of claim 21, wherein the device is programmed and configured to recover from a loss of any of its parents associated with the plurality of peer-to-peer trees by performing the steps of:
detecting a loss of a parent in a respective one of the plurality of peer-to-peer trees;
in response to detecting the loss of a parent of one of the plurality of peer-to-peer trees, selecting an alternative parent in the one of the plurality of peer-to-peer trees; and
establishing a connection to the alternative parent to reconnect to the tree.

* * * * *